(12) United States Patent
Hogancamp et al.

(10) Patent No.: US 11,325,863 B2
(45) Date of Patent: May 10, 2022

(54) FIBER REINFORCED CEMENT

(71) Applicants: Joshua Hogancamp, College Station, TX (US); Zachary Grasley, College Station, TX (US)

(72) Inventors: Joshua Hogancamp, College Station, TX (US); Zachary Grasley, College Station, TX (US)

(73) Assignee: The Texas A&M University System, College Station, TX (US)

( * ) Notice: Subject to any disclaimer, the term of this patent is extended or adjusted under 35 U.S.C. 154(b) by 104 days.

(21) Appl. No.: 16/634,160

(22) PCT Filed: Jul. 30, 2018

(86) PCT No.: PCT/US2018/044330
§ 371 (c)(1),
(2) Date: Jan. 26, 2020

(87) PCT Pub. No.: WO2019/023698
PCT Pub. Date: Jan. 31, 2019

(65) Prior Publication Data
US 2021/0094878 A1    Apr. 1, 2021

Related U.S. Application Data

(60) Provisional application No. 62/538,113, filed on Jul. 28, 2017.

(51) Int. Cl.
| | |
|---|---|
| *C04B 28/04* | (2006.01) |
| *C04B 14/02* | (2006.01) |
| *C04B 14/38* | (2006.01) |
| *C04B 20/00* | (2006.01) |
| *C04B 20/10* | (2006.01) |
| *B82Y 30/00* | (2011.01) |
| *C04B 111/34* | (2006.01) |

(52) U.S. Cl.
CPC ............ *C04B 28/04* (2013.01); *C04B 14/026* (2013.01); *C04B 14/386* (2013.01); *C04B 20/006* (2013.01); *C04B 20/1037* (2013.01); *C04B 20/1048* (2013.01); *B82Y 30/00* (2013.01); *C04B 2111/34* (2013.01)

(58) Field of Classification Search
CPC ... C04B 14/026; C04B 14/386; C04B 20/006; C04B 20/1037; C04B 20/1048; C04B 28/04; C04B 2111/34; B82Y 30/00
See application file for complete search history.

(56) References Cited

U.S. PATENT DOCUMENTS

| | | | | |
|---|---|---|---|---|
| 5,062,897 A | * | 11/1991 | Katsumata | C04B 28/02 106/696 |
| 2014/0111231 A1 | * | 4/2014 | Mo | G01N 27/041 324/705 |

FOREIGN PATENT DOCUMENTS

| | | | | |
|---|---|---|---|---|
| CN | 104446264 A | * | 3/2015 | |
| CN | 106278026 A | * | 1/2017 | |
| JP | 2002029811 A | * | 1/2002 | |

* cited by examiner

*Primary Examiner* — Anthony J Green
(74) *Attorney, Agent, or Firm* — Benjamin Aaron Adler

(57) ABSTRACT

Provided herein are fiber reinforced cementitious materials and mixtures with increased crack resistance. The cementitious materials and mixtures include a cement and at least one carbon fiber. Also provide is a fiber reinforced cementitious mortar that includes the fiber reinforced cementitious material to which at least one of water, an aggregate material or a chemical admixture is added.

19 Claims, 18 Drawing Sheets

FIBER REINFORCED CEMENT

CROSS-REFERENCE TO RELATED APPLICATIONS

This is a national stage application under 35 U.S.C § 371 of pending international application PCT/US2018/044330, filed Jul. 30, 2018, which claims benefit of priority under 35 U.S.C. § 119(e) of provisional application U.S. Ser. No. 62/538,113, filed Jul. 28, 2017, the entirety of which is hereby incorporated by reference.

BACKGROUND OF THE INVENTION

Field of the Invention

The present invention relates generally to the field of concrete-like compositions. More specifically, the present invention relates to a moderate strength chalk- or calcium carbonate-based, such as a cementitious composition, material or mixture.

Description of the Related Art

Portland cement based materials (PCBMs), the single most consumed material in the world, are quasi-brittle materials that have limited tensile strengths and strain capacities. Cracks often form in concrete during structural loading, foundation settlement, when exposed to fatigue, and when exposed to harsh environments. Concrete structures in the United States predominantly fail not from structural defects or excessive loading but from corrosion. According to research from NACE International, the estimated annual direct and indirect cost of concrete corrosion in the US is $7.8 billion. Cracks in concrete allow water and deleterious chemicals such as deicing salts to penetrate and subsequently degrade the material as well as the reinforcing steel commonly used in concrete.

Concrete cracking can be caused by either internal or external forces. External forces are encountered in structural application and include wind loads, vehicles on roads, structural dead weight loads, etc. Pavements and slabs are susceptible to foundation settlement and subgrade heave or erosion; high-rise structures are susceptible to wind forces that bend the structure and place the outer layers of concrete in tension, causing cracks on the outermost surfaces. Internal forces are found in almost all applications of concrete and are caused by drying shrinkage, autogenous shrinkage, sulfate attack, corrosion of reinforcing steel, and thermal gradients. Drying shrinkage and thermal gradients place the concrete under a non-uniform tension profile with high tension at the exposed surface and no tension inside the material, causing cracks on the exposed surface.

Autogenous shrinkage causes the cement paste to shrink around aggregates and crack. Sulfate attack and reinforcing steel corrosion cause the inclusions (either aggregates or steel) to expand, placing the surrounding cement paste in tension which leads to cracking.

One of the best ways to mitigate concrete degradation is to limit the amount of water that can penetrate through the outermost layer of material by minimizing the size of the cracks that form. Such crack size minimization is often attempted by using macrofibers such as steel, polyvinyl alcohol, polypropylene, or others to bridge the cracks after formation. The size of fibers strongly dictates the number of cracks and the average crack widths that form in brittle matrices like Portland cement paste, mortar, and concrete; the larger (longer, larger diameter) a fiber, the fewer (but larger) the cracks that form. Commonly used microfibers such as polyvinyl alcohol microfibers (PVA) restrain cracks after they form in the material, but the cracks are large enough to see with the unaided eye (>0.1 mm). Since transport properties through a cracked material roughly scale with the cube of crack width (1), it is preferable from a durability perspective to have a material with many very small cracks rather than a few larger cracks. In fiber reinforced concrete, it has been proposed that the distance between cracks (and therefore the size of the cracks themselves) is directly proportional to the radius of the fibers (2,3), so the use of nanofibers should theoretically result in multitudinous micro/nanocracks in concrete that are too small to be seen with the unaided eye.

One of the most difficult challenges in using microfibers and nanofibers in concrete and other PCBMs is thoroughly dispersing the fibers throughout the mixture. Microfibers can be adequately mixed throughout the material with more strenuous mechanical mixing (either longer mixing times with typical mixing techniques or higher energy input into mixing per unit time). However, the susceptibility of nanoparticles and nanofibers to thermal effects and van der Waals' forces, especially in water where materials such as carbon nanofibers (CNFs) and carbon nanotubes (CNTs) display hydrophobic tendencies, creates a ubiquitous hindrance to successfully incorporating CNFs and CNTs into PCBMs since the nanoparticles readily agglomerate together to form clumps on the order of micrometers or millimeters. These clumps lead to inconsistent material properties and potentially diminished material strength and stiffness (4). The tendency of CNFs to agglomerate also severely limits the concentration of CNFs that can be included in an ordinary Portland cement (OPC) composite without clumping.

Another challenge in dispersing nanofibers throughout PCBMs is an effect called geometric clustering. Geometric clustering occurs when a mixture has constituents that greatly vary in size and/or shape. This geometric clustering can occur in OPC reinforced with nanofibers.

The prior art is deficient in a concrete-like composition with improved durability, enhanced crack resistance, compressive strength, flexural strength, and impact toughness. The present invention meets this longstanding need and desire in the art.

SUMMARY OF THE INVENTION

The present invention is directed to a fiber reinforced cementitious material with increased crack resistance. The material comprises cement and at least one carbon fiber. The present invention is directed to a related fiber reinforced cementitious material that further comprises water.

The present invention also is directed to a fiber reinforced mortar. The fiber reinforced mortar comprises the cement and at least one carbon fiber of the fiber reinforced cementitious material as described herein, an aggregate material, a chemical admixture, and water.

The present invention is directed further to a fiber reinforced cementitious mixture with an increased resistance to cracking. The fiber reinforced cementitious mixture comprises at least one carbon fiber mixed with a cement at 15% or less by weight of the cement by a carbon fiber type. The present invention is directed to a related fiber reinforced cementitious mixture that further comprises at least one of water, an aggregate material or a chemical admixture.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIG. 3A shows OPC with 1 wt % CNFs. FIG. 3B shows microfine cement with 1 wt % CNFs. FIG. 3C OPC with 2 wt % CNF showing some CNF clumping. FIG. 3D shows Microfine cement with 2 wt % CNFs showing no CNF clumps. FIG. 3E shows OPC with 3 wt % CNFs showing severe CNF clumping between the larger cement grains; the regions between the large OPC grains are filled with CNF clumps mixed with the smaller cement grains. FIG. 3F shows microfine cement with 5 wt % showing no CNF clumping.

DETAILED DESCRIPTION OF THE INVENTION

Figure 1:
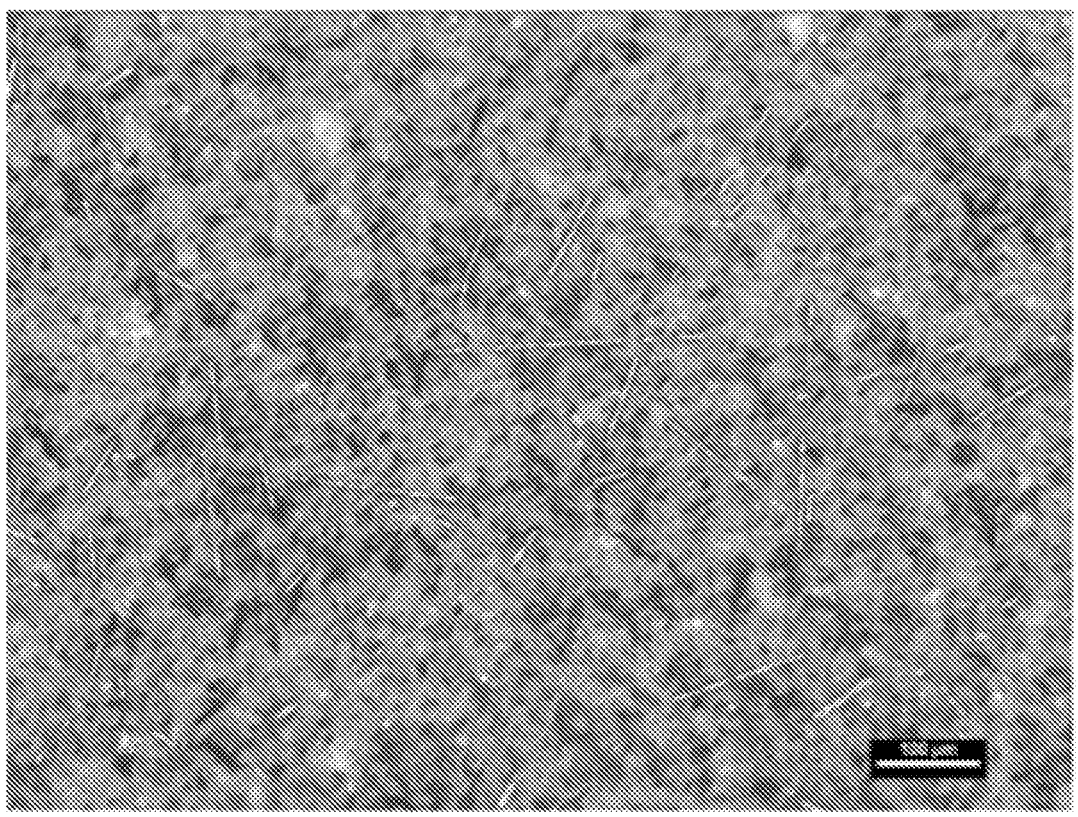
FIG. 1 is an image of OPC with 4% MCMF's pre-mixed. MCMFs are white in this image due to light reflecting off the fibers.

The following abbreviations and nomenclature may be used herein:
Aspect ratio fiber length/fiber diameter
CCMF Chopped carbon microfiber
CMF Carbon microfiber
CMOD Crack-mouth opening displacement
CNF Carbon nanofiber
CNT Carbon nanotube
D Dispersion parameter
E Young's modulus (generic)
FE Finite element
FRC Fiber-reinforced cement/concrete/cementitious material
HRWR High range water reducer
Critical fiber length
Macrofiber Fibers with diameters approximately >0.5 mm
MCMF Milled carbon microfiber
Microfiber Fibers with diameters ranging approximately from 1-500 μm
MSE Mean square error of data set
n Number of samples in a data set
Nanofiber Fibers with diameters ~100-200 nm
Nanotube Fibers with diameters ~2-10 nm
OPC Ordinary Portland cement
P Applied load PCBM Portland cement-based material
PVA Polyvinyl alcohol
q q-value in Tukey's statistical analysis
RH Relative humidity
$R_{xx}$ A radius
SEM Scanning electron microscopy
$S_i$ Work vector to move a particle to a fully uniform dispersion
Sp Spacing between cracks
$V_f$ Volume fraction of fibers
$V_m$ Volume fraction of matrix
vol % Percent by volume, by volume of cement unless otherwise stated
W Watts
w/c ratio Mass ratio of water to cement
$W_i$ Work vector to move a particle to a fully non-uniform dispersion
wt % Percent by weight, by weight of cement unless otherwise stated
α Significance value in Tukey's statistical analysis
$γ_r$ Degree of restraint
ε Strain (generic)
η Crack width
μ Data set mean
σ Stress (generic)
$σ_{fixed}$ Theoretical maximum stress for a fully restrained specimen
$σ_{fu}$ Ultimate tensile strength of a fiber
$σ_{mu}$ Ultimate tensile strength of a cementitious matrix
$τ_{fu}$ Ultimate bond/slip strength between fibers and matrix
ϕ Ratio of increase of permeability and diffusivity due to cracking As used herein the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein "mixture designation" is 'Cement type' 'w/c ratio'—'wt % CNFs'. 'wt % MCMFs'. 'wt % Other fiber'. Example 1: "OPC0.4-2.0" is an OPC mortar with a w/c ratio of 0.4, 2 wt % CNFs, 0 wt % MCMFs, and no other fibers. Example 2: "F0.5-2.2" is a microfine cement mortar with a w/c ratio of 0.5, 2 wt % CNFs, 2 wt % MCMFs, and no other fibers. Example 3: "F0.6-5.5.3" PVA is a microfine cement mortar with a w/c ratio of 0.6, 5 wt % CNFs, 5 wt % MCMFs, and 3 wt % PVA microfibers.

In one embodiment of the invention, there is provided a fiber reinforced cementitious material with increased crack resistance, comprising cement; and at least one carbon fiber. Further to this embodiment the fiber reinforced cementitious material comprises water.

In this embodiment, the cement may be Ordinary Type I/II Portland cement, a microfine Portland cement, or a ceramic cement binder, or a combination thereof. Also in this embodiment, the carbon fiber may be a carbon nanofiber, a milled carbon microfiber, a chopped carbon microfiber, a polyvinyl alcohol microfiber, or a combination thereof. Representative carbon nanofibers may be about 5 nanometers to about 150 nanometers in diameter and about 5 micrometers to about 200 micrometers in length. Representative carbon microfibers may be about 3 micrometers to 15 micrometers in diameter and range from less than 1 millimeter to over 15 millimeters in length. In addition the carbon fiber may be 15% or less by weight of the cement per a carbon fiber type.

In this embodiment the cement and at least one carbon fiber may comprise a premixture. Also, the cementitious material has an increased resistance to cracking due to restrained drying shrinkage, and bridges microcracks and delays formation of macro cracks, a high flexure strength, an increased compressive strength, and an increased impact toughness. Particularly, the cementitious material may have an increased cracking resistance of at least 5,200% without loss to flexure strength, compressive strength or impact toughness.

In another embodiment of the invention, there is provided a fiber reinforced mortar comprising the cement and at least one carbon fiber of the fiber reinforced cementitious material as described supra; an aggregate material; a chemical admixture; and water. In this embodiment the aggregate material may be sand, gravel or crushed stone or a combination thereof. Also in this embodiment the chemical admixture may comprise a polycarboxylate high-range water reducer (HRWR) or a sucrose-based retarder or a combination thereof. Particularly, the chemical admixture may be 4% or less by weight of the cement.

In yet another embodiment of the invention, there is provided a fiber reinforced cementitious mixture with an increased resistance to cracking, comprising at least one carbon fiber mixed with a cement at 15% or less by weight of the cement per a carbon fiber type. Further to this embodiment the fiber reinforced cementitious mixture comprises at least one of water; an aggregate material; or a chemical admixture.

In both embodiments the fiber reinforced cementitious mixture may comprise at least one of a carbon nanofiber, a milled carbon microfiber, a chopped carbon microfiber, a polyvinyl alcohol microfiber mixed with an Ordinary Type I/II Portland cement, a microfine Portland cement, or a ceramic cement binder, or a combination thereof. Also in both embodiments the carbon nanofiber is about 5 nanometers to about 150 nanometers in diameter and about 5 micrometer to about 200 micrometers in length. In addition the cementitious mixture has an increased resistance to cracking of at least 5,200% without loss to flexure strength, compressive strength or impact toughness.

In both embodiments the aggregate material may be sand, gravel or crushed stone or a combination thereof. Also, the chemical admixture may comprise a polycarboxylate high-range water reducer (HRWR) or a sucrose-based retarder or a combination thereof. In a representative example, the chemical admixture may be 4% or less by weight of the cement.

Provided herein are fiber reinforced cements, cementitious materials or mixtures and fiber reinforced mortars. The fiber reinforced cementitious materials or mixtures and fiber reinforced mortars have an increased resistance to cracking. The cementitious materials, mixtures and mortars comprise at least one type of carbon fiber, such as, but not limited to, one or more of a carbon nanofiber, a milled carbon microfiber, a chopped carbon microfiber, or a polyvinyl alcohol microfiber. The presence of the one or more carbon nanofibers restrains drying shrinkage, bridges microcracks and delays formation of macro cracks and provides a high flexure strength, an increased compressive strength, and an increased impact toughness to the cementitious material, mixtures and mortars containing the same. The fiber reinforced cementitious materials or mixtures comprise a cement, such as, but not limited to, one or more of an Ordinary Type I/II Portland cement or a microfine Portland cement or a ceramic cement binder, as are known in the art. Particularly, the cement and the carbon nanofiber(s) may be a premixture such as may comprise a fiber reinforced mortar as described herein.

The fiber reinforced mortars provided herein may comprise the cement and carbon fiber(s) as described and at least one of water, an aggregate material and a chemical admixture. Particularly, the aggregate material may be those materials known in the art such as sand, gravel, or crushed stone with or without stone dust. Chemical admixtures as known in the art may be a polycarboxylate high-range water reducer (HRWR) or a sucrose-based retarder or a combination thereof.

The fiber reinforced cementitious materials and mixtures may be prepared by standard methods well known in the art and described herein. Generally, the fiber reinforced cementitious material or mixture may be prepared by 1) sonicating an alcoholic solution containing carbon fibers to form a dispersion of carbon fibers in the solution, and mixing the dispersion of carbon fibers and alcohol and a cement and sonicating the mix to form a cement/carbon fiber powdered material cake or 2) tumbling the cement and carbon fibers in a rotary tumbler. Water, an aggregate material and/or a chemical admixture may be added to produce a fiber reinforced mortar.

The present invention is explained in greater detail by means of the nonlimiting examples below. The amounts are in parts by weight of cement, unless otherwise indicated.

Example 1

Methods and Materials
Carbon Fibers
Table 1 lists the type of carbon fibers utilized in the cementitious material and their structural characteristics.

TABLE 1

| Fiber Type | Diameter | Length | Tensile Strength (MPa) | Elastic Modulus (GPa) | Elongation at Break (%) |
|---|---|---|---|---|---|
| CNF | 70-200 nm | 50-200 μm | 2920 | 240 | — |
| MCMF | 7.2 μm | ~100 μm* | 4137 | 242 | 1.5 |
| CCMF | 7.2 μm | 13 mm | 4137 | 242 | 1.5 |
| PVA | 38 μm | 8 mm | 1600 | 41 | 13 |

*Length varies due to ball-milling process

Fabrication Process for Carbon Cements and Mortars

The most important aspect of successfully incorporating CNFs into PCBMs is dispersion. A good dispersion of CNFs can improve the mechanical properties of the composite while a poor dispersion of CNFs can prove a detriment. CNFs that are purchased en masse are typically tangled in hairball structures. The PR-24-XT-PS CNFs from Pyrograf Products, Inc, used had diameters of 50-150 nm and lengths of 50-200 μm as purchased. Scanning electron microscopy (SEM) imaging was conducted on a Jeol-7700 SEM. The OPC used in this study was a standard Type I/II cement that can be purchased from any construction store. Sonication procedures utilized a Sonics VCX750 probe-tipped sonicator with a CV33 probe at 20 kHz and 40% amplitude. Mechanical stirring was constantly employed using a Corning PC-353 magnetic stirring plate to encourage an even dispersion.

Sonication in Alcohol

A method of dispersion CNFs among cement grains was utilized based on the work of Makar et al (5). The CNFs were sonicated in pure ethyl alcohol with the cement in relatively low solids-to-alcohol concentrations to allow the CNFs to fully disentangle and disperse among the cement grains, and then the alcohol was evaporated using a distillation column to leave behind a pre-mixed hybrid CNF/cement powder. Using a low solids-to-alcohol concentration allowed for any concentration of CNFs in cement to be created by limiting the CNFs in the alcohol and adding a proportional amount of cement. The CNFs were initially sonicated in pure ethyl alcohol for 15 minutes, and then cement was added to the alcohol/CNF suspension and further sonicated for an additional 30 minutes. CNFs and cement were added in exact proportions to maintain mass ratios, e.g. 2.00 grams of CNFs with 100.0 grams of cement for 2 wt % CNFs. Mechanical stirring was constantly employed using a magnetic stirring plate to encourage an even dispersion throughout the slurry. After sonication, the slurry was poured into a distillation column to remove and recapture the bulk of the alcohol. The material remaining in the distillation column was then transferred to a well-ventilated oven for 24 hours at 105° C. to ensure that all alcohol was removed. A hybrid cement/CNF 'cake' was produced in this process that was easily powdered using a metal utensil or a mortar and pestle.

The addition of high concentrations of CNFs to the cement changed the color of the material. As a trial experiment, up to 10 wt % CNFs were added to a microfine cement, and the cement became increasingly black. Adding microfibers did not change the color; only adding CNFs changed the color of the composite.

Rotary Tumbling

If the fiber reinforced cement included only MCMFs, the MCMFs were mixed with the cement by placing both in a rotary tumbler for 12 hours at a speed of 1 rotation per second. Optical microscope observations confirmed that the MCMFs were adequately dispersed in the OPC (FIG. 1). The MCMFs were well dispersed throughout the material, and no clumps of MCMFs were found.

Cement Types

Figure 2:
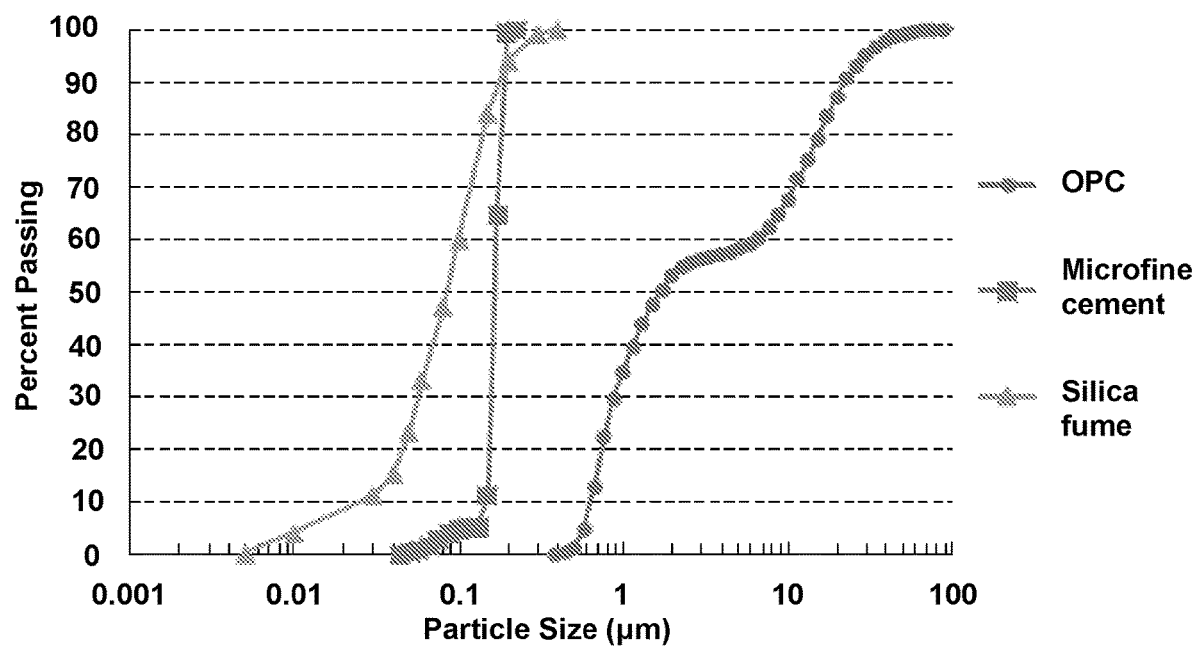
FIG. 2 shows percent passing graph showing the grain size distributions for OPC, microfine cement, and silica fume.

One of the issues of using carbon nanofibers in PCBMs is CNF transport through fresh cement paste. CNFs in OPC freely translate through the fresh material, and a foam layer of CNFs can form on top of the cement during consolidation. It has been seen in literature that incorporating silica fume into the mixture stabilizes the system and inhibits CNF transport. Therefore, it was hypothesized that using a microfine Portland cement with a grain size distribution similar to silica fume would have the same stabilization effects of silica fume while simultaneously allowing higher dispersed concentrations of CNFs than an OPC mixture with 10% silica fume by mass of cement. The two cements used were a common Type I/II Portland cement and a microfine Portland cement manufactured by Capitol Cement in San Antonio, Tex. The cement grain size distributions are shown in FIG. 2 along with that of a typical silica fume for comparison purposes as determined by a Horiba LA-910 particle size analyzer. The microfine cement has a mostly uniform grain size distribution in the same range as silica fume, and all grains are smaller than those in the OPC. The Blaine fineness of the OPC and the microfine cement are ~350 m$^2$/kg and >12,000 m$^2$/kg, respectively.

SEM Imaging of Dispersion

Figure 3A:
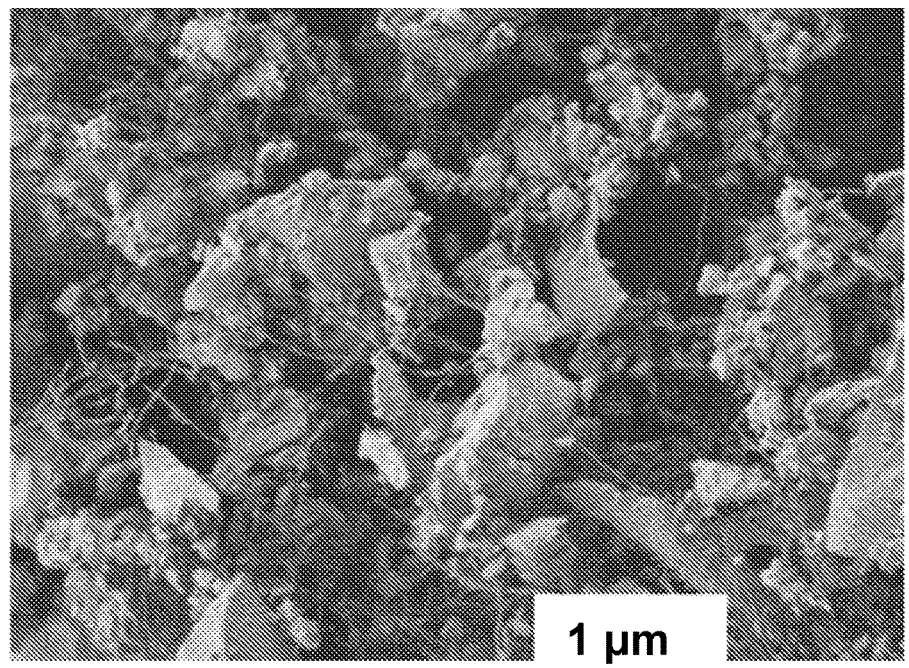
FIG. 3A-3F shows SEM images of hybrid cement powders.
Figure 3B:
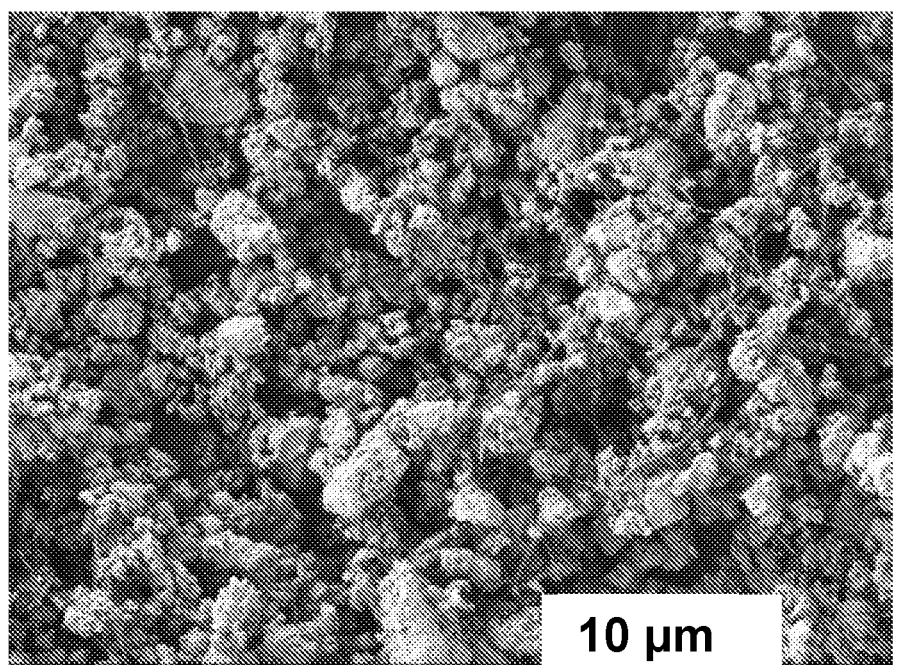
Figure 3C:
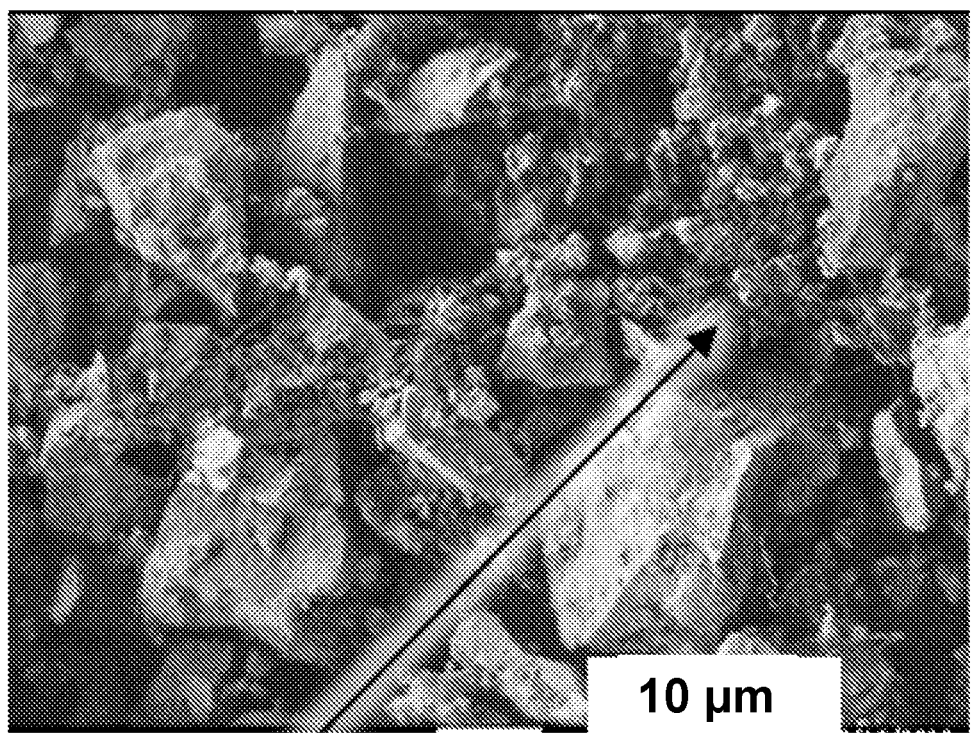
Figure 3D:
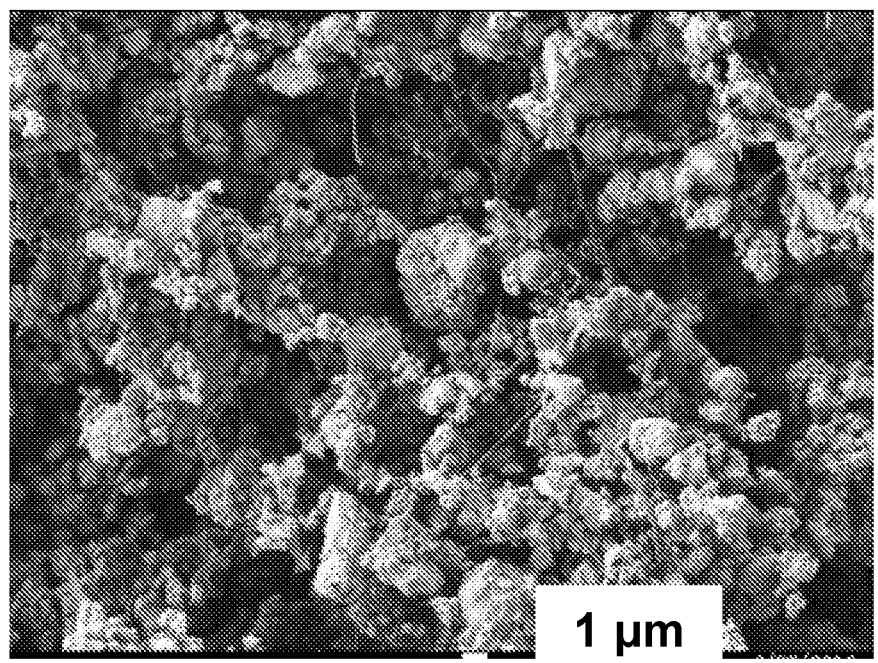
Figure 3E:
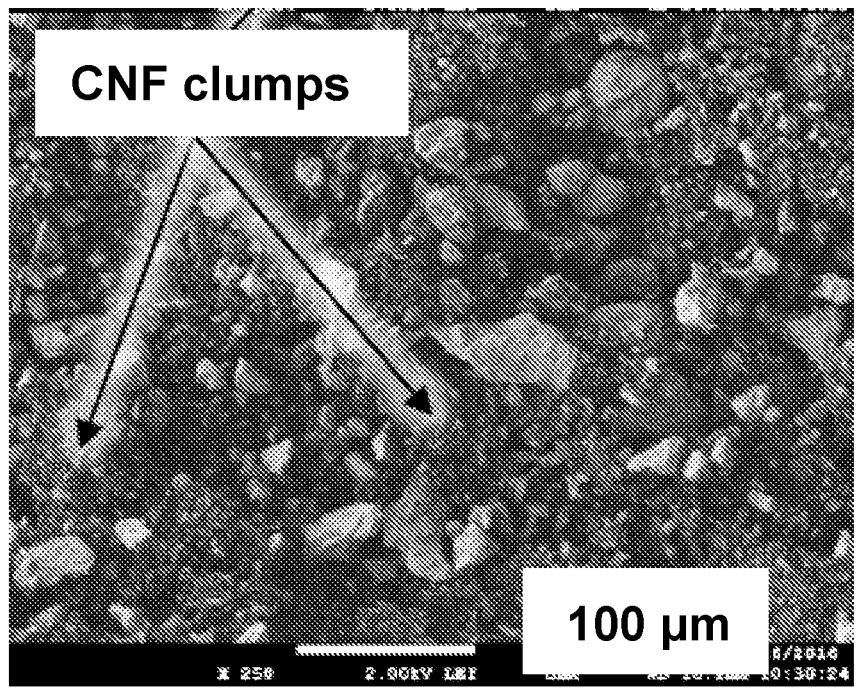
Figure 3F:
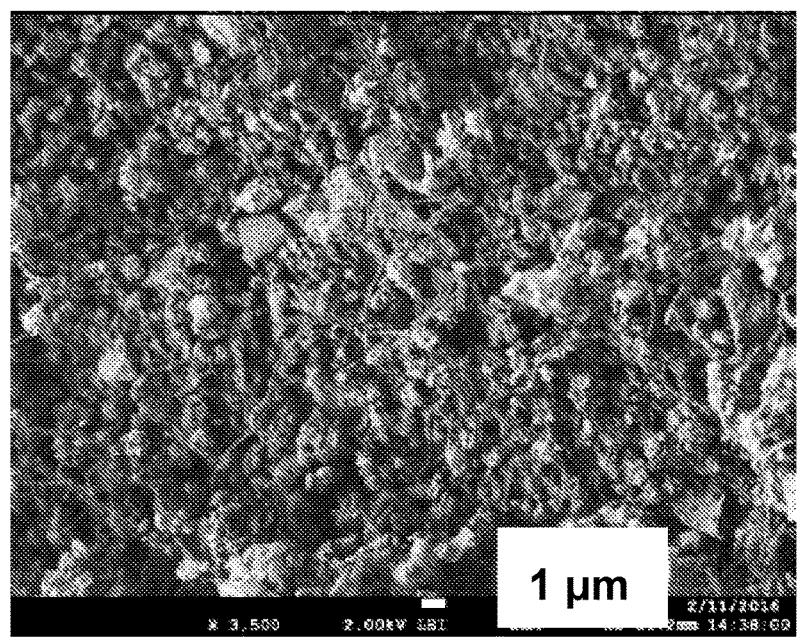

Initial SEM imaging of the hybrid cement powders revealed that the microfine cement with CNFs had far fewer clumps of CNFs than did the OPC with the same concentrations of CNFs as shown in FIGS. 3A-3F. FIG. 3A is OPC with 1 wt % CNFs. FIG. 3B is microfine cement with 1 wt % CNFs. FIG. 3C is OPC with 2 wt % CNF showing some CNF clumping. FIG. 3D is microfine cement with 2 wt % CNFs. showing no CNF clumps. FIG. 3E is OPC with 3 wt % CNFs showing severe CNF clumping between the larger cement grains; the regions between the large OPC grains are filled with CNF clumps mixed with the smaller cement grains. FIG. 3F is microfine cement with 5 wt % showing no CNF clumping. The cement grain size difference between OPC and microfine is clear. As the concentration of CNFs increases in OPC, the CNF clumping between the larger cement grains becomes more obvious, whereas increasing the concentration of CNFs in the microfine cement does not necessarily lead to CNF clumping.

Mortar Mixing Techniques

CNFs were added to the cement, other fiber types that were added to some restrained ring shrinkage tests include milled carbon microfibers (MCMFs), chopped carbon microfibers (CCMFs), and polyvinyl alcohol (PVA) microfibers. The CNFs used were PR-24-XT-PS purchased from Pyrograf Products, Inc. The PX35MF0150 MCMFs and PX35CF0125-13 CCMFs were purchased from Zoltek. The PVA RECS15 microfibers were purchased from Nycon. CCMFs were added to the hybrid cement mixtures using the same sonication process described above. If the hybrid mixture had CNFs and MCMFs, the MCMFs were added to the sonication slurry at the same time as the cement. If the microfine cement hybrid mixture had only MCMFs, the MCMFs and cement were sonicated for 10 minutes with mechanical stirring. If the OPC mortars included only MCMFs, the MCMFs were mixed with the OPC by placing both in a rotary tumbler for 12 hours at a speed of 1 rotation per second. Optical microscope observations confirmed that the MCMFs were adequately dispersed in the OPC.

The mortar was proportioned with a water/cement mass ratio of 0.4-0.6 and a sand/cement mass ratio of 1.75. An ASTM 20-30 Ottawa silica sand was chosen because of its minimal fines content and its minimal absorption capacity; a primary motivation for the inclusion of sand in the test mixtures was to aid in breaking apart any cement clumps during mixing. The sand passes through a No. 20 sieve and is retained on a No. 30 sieve (roughly 600-850 µm in diameter). This is considered a fine aggregate but is mid-sized for sand; a No. 200 sieve, the finest sand sieve, has a 74 µm spacing. The admixtures used were a polycarboxylate high-range water reducer (HRWR) and a sucrose-based retarder. The HRWR was needed in OPC mixtures with CNFs and in all microfine mixtures. The retarder was needed in the microfine mixtures since this cement sets in less than 5 minutes in ambient conditions; all microfine mixtures used 3 wt % retarder to delay set to approximately 40 minutes. It should be noted that the OPC mixture with 1 wt % CNFs was, for reasons unclear, susceptible to flash set, so 3-4 drops (~0.2 milliliters) of retarder were added to each kilogram of mortar.

Each mortar mixture was mixed using a Hobart N50 mortar mixer. The incorporation of such high concentrations of CNFs and the use of microfine cement required a non-standard mixing procedure. The water was mixed with the liquid admixtures, and then the sand and liquids were placed into the bottom of the mixing bowl. The cement hybrid powder was added and mixed on low for 60 seconds. A metal spatula was used to scrape the sides of the bowl and the mixing paddle to remove any material that may have become congealed. The material was mixed on low if the material was still solid-like (resembling a powder or individual particles) or on medium/high if the material was liquid-like (a single, malleable mass or a liquid) for an additional 120 seconds, and then the sides of the mixing bowl and the mixing paddle were scraped again. The material was mixed for an additional 180 seconds, and then the consistency of the material was qualitatively examined. If the mixture was still solid-like, the process was repeated in 120 second mixing intervals until the mixture became fluid for at least 120 seconds. This process could require 15 minutes of mixing for microfine cement with 5 wt % CNFs and 5 wt % MCMFs. Mortar was placed in molds in 25 mm lifts and rodded 75 times per lift with a 6 mm glass stirring rod, and each lift was vibrated for up to 120 seconds. Microfine cement mixtures required 120 seconds of vibration per lift due to the high water demand of the microfine cement and the CNFs; no bleeding occurred in any microfine cement mixture. OPC mixtures required as little as 5 seconds of vibration (for samples without CNFs) or up to 20 seconds of vibration (for samples with 3 wt % CNFs); no bleeding occurred in OPC samples with no CNFs.

Example 2

Free Drying Shrinkage Prisms

The first property analyzed to supplement the restrained ring drying shrinkage test was unrestrained drying shrinkage. Free drying shrinkage prisms were fabricated using the molds specified in ASTM C490: 25 mm×25 mm×279 mm prisms with gage studs in the ends (6). Three specimens were cast for each mixture that contained no CNFs and for each mixture that contained 3 wt % CNFs. The specimens were cast and cured at 98% RH and 23° C. for 24±0.5 hours with the tops of the specimens exposed. They were demolded at 24±0.5 hours, the tops and bottoms of the specimens were sealed with aluminum-backed foil tape, and their mass losses and length changes were recorded under exposure to constant 50% RH and 23° C. The data points were recorded every 2 hours for the first 14 hours and then at irregular intervals. The drying prisms had two opposing faces sealed with aluminum tape to mimic the 1-dimensional drying conditions of the rings.

Figure 4:
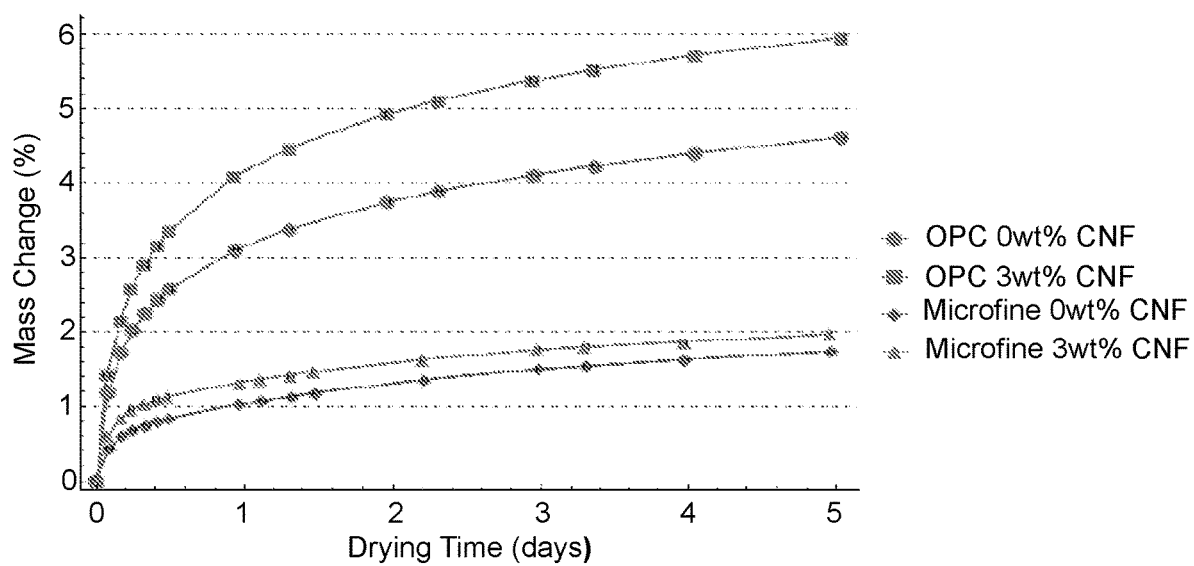
FIG. 4 shows percent change in mass of drying shrinkage mortar prisms. Error bars are one standard deviation from the mean but are almost too small to be seen in the image.
Figure 5:
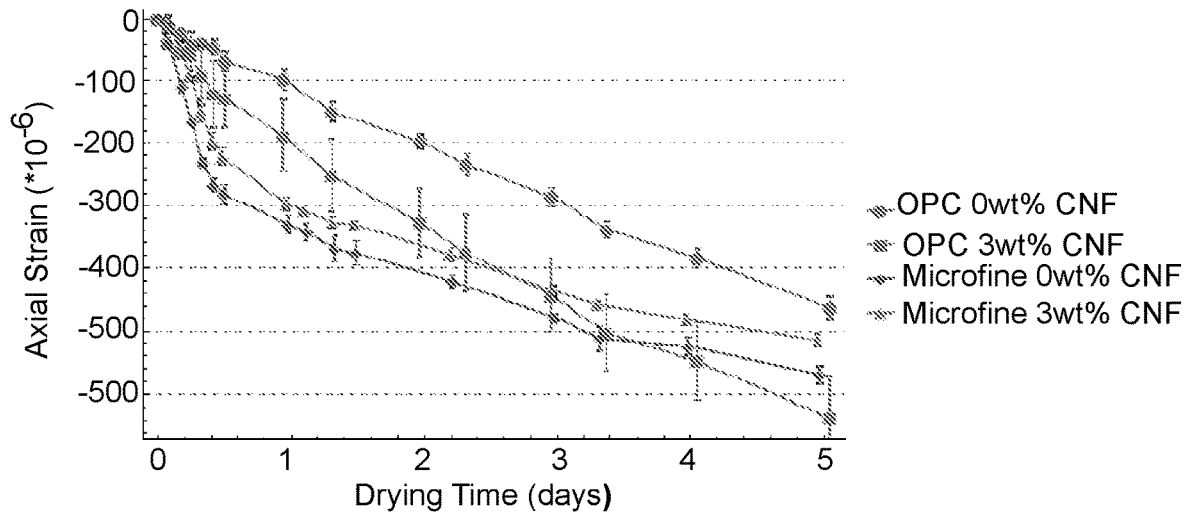
FIG. 5 shows unrestrained axial strain of drying shrinkage mortar bars. Error bars are one standard deviation from the mean.

Mass loss and axial shrinkage data for both cement types (with and without CNFs), presented in FIG. 4 and FIG. 5, shed light on the pore structure of the materials and provide beneficial information for interpreting the ring test results.

FIG. 4 shows that both cement types had a higher rate of mass loss with the addition of CNFs, though the difference between plain and CNF mortar is smaller in microfine cement mortar. The OPC mortars lose more mass than the microfine mortars after 1 day of curing. This is likely due to a finer pore structure developing early in the microfine mortar since the microfine cement hydrates much faster than the OPC. A fine pore structure will retain more water at a given RH than will a coarse pore structure due to osmotic suction effects. The water trapped inside coarse pores will readily evaporate at a given RH while the water trapped inside fine pores will not readily evaporate. Furthermore, the hypothesis that the microfine cement pore structure is refined at an earlier age is corroborated by the free axial shrinkage data shown in FIG. 5. The microfine cement mortar had reduced axial shrinkage strain rate with the addition of CNFs, while OPC had an increased axial shrinkage strain rate with the addition of CNFs.

The microfine mortars initially had more axial drying shrinkage than did the OPC mortars; a finer pore structure can induce greater shrinkage at a given RH since a material with fine pores will have higher osmotic suction than a material with coarse pores (7-9).

The OPC mortar with 3 wt % CNFs is shown in FIG. 4 to have increased mass loss while having increased free axial shrinkage in FIG. 5 (compared to the control). These effects are attributed to excessive CNF clumping in the cement due to geometric clustering. CNFs that are clumped together between the larger cement grains would increase the pore sizes in those zones. It is theorized that the clumped CNF zones created a network of larger pores in the composite material that allowed water inside the material to evaporate more quickly via the network. An increased rate of drying throughout the material would simultaneously increase the rates of mass loss and free axial shrinkage.

The microfine cement with 3 wt % CNFs is shown in FIG. 4 to have slightly increased mass loss while having decreased free axial shrinkage in FIG. 5 (compared to the control). These effects are attributed to a slight pore coarsening the material due to the CNFs. A coarser pore structure would increase mass loss while reducing free axial shrinkage at a given RH since the water would evaporate more readily due to decreased osmotic suction effects at that RH.

The pore coarsening in the hybrid microfine cement is not the same as the effect that CNFs have in OPC. In the hybrid microfine cement, the cement pore structure is uniformly coarsened (slightly) by the addition of CNFs. In the hybrid OPC, the cement pore structure is theorized to be minimally affected by the CNFs since most of the CNFs agglomerate between the larger cement grains; however, the agglomerations of CNFs create a network of voids (highways for moisture, of a sort) that link the hydrated OPC zones to the exterior.

Example 3

Mortar Cube Elastic Modulus

Figure 6:
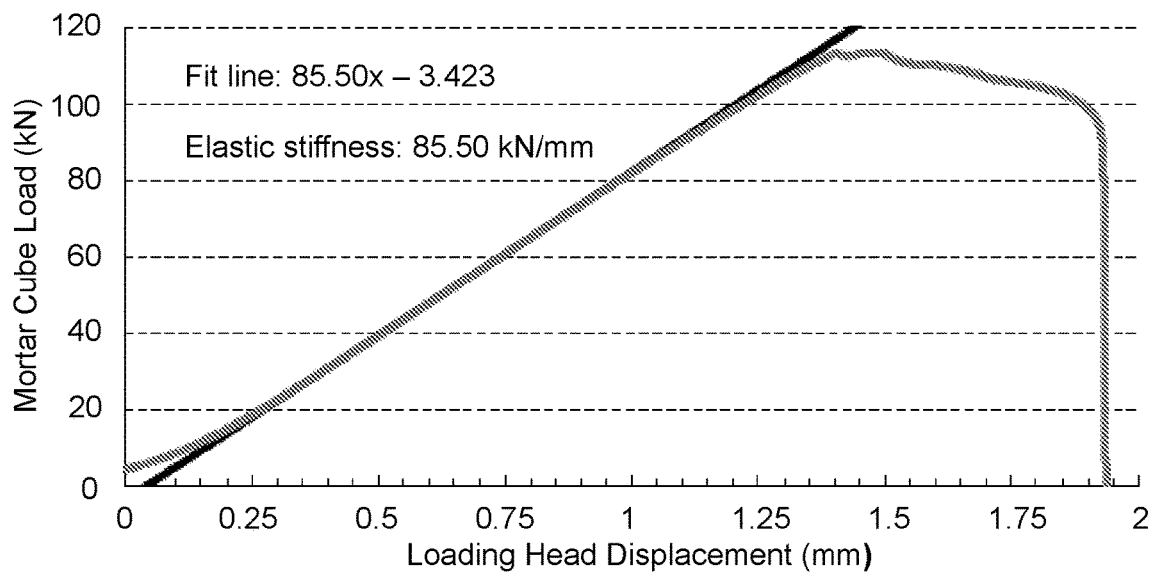
FIG. 6 shows load vs loading head displacement of a 2.45 cm mortar cube compression test. Elastic stiffness of the mortar cube was approximated using a fit line through the roughly linear portion of the load vs displacement curve.

Mortar samples were prepared for testing at 1 day, 3 days, 7 days, and 28 days. ASTM standards were followed for time of testing, e.g. 1-day testing occurred at 24±0.5 hours. After 24±0.5 hours, the samples were demolded and exposed to 98% relative humidity (RH) and 23° C. until time of testing. Three 50 mm mortar cubes cast using molds described in ASTM C109 were uniaxially compressed for each mixture using a displacement-controlled load frame at a rate of 1 mm/min with data points recorded at 20 Hz (10). An elastic modulus was approximated via the (roughly) linear portion of the slope of the mortar cube load vs loading head displacement curve as shown in FIG. 6. Elastic stiffness results are normalized by the control mixture for each cement type rendering the units for elastic stiffness irrelevant.

Figure 7:
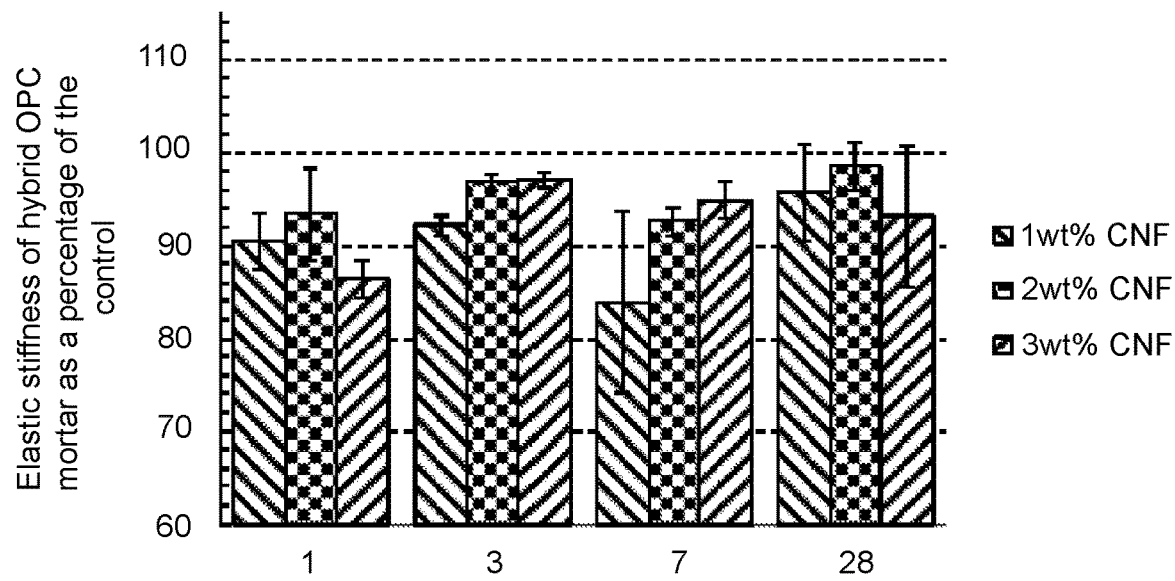
FIG. 7 shows elastic stiffness of hybrid OPC mortars as a percentage of the control. Error bars are 0.5*range.
Figure 8:
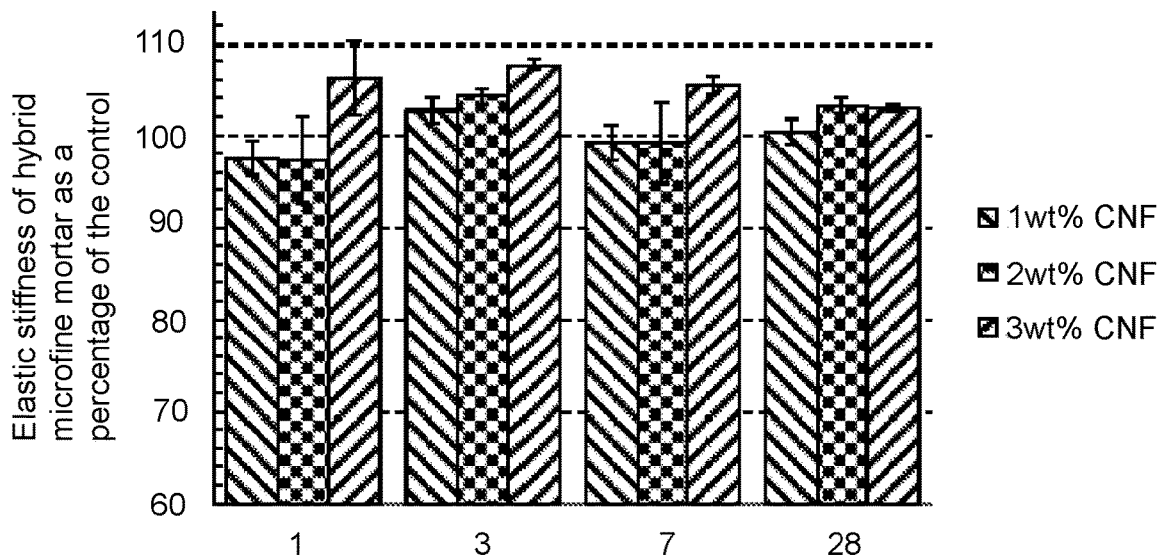
FIG. 8 shows elastic stiffness of hybrid microfine cement mortars as a percentage of the control. Error bars are 0.5*range.

The mortar cube elastic moduli for ages 1 day, 3 days, 7 days, and 28 days at various concentrations of CNFS are shown in FIG. 7 and FIG. 8 as normalized by the control; i.e. a value of 100% indicates that the specimen had the same stiffness/flexural strength as the specimen without CNFs. The elastic stiffness of the hybrid microfine mortar shown in FIG. 8 was not significantly impacted and remained within 8% of the control specimens. The elastic stiffness of hybrid OPC mortar shown in FIG. 7 revealed no specific trend, but 75% of specimens had a lower stiffness than the control mixture.

The compression cubes elastic moduli results reinforce the proposition that the dispersion of CNFs is improved in the hybrid microfine cement versus the hybrid OPC. The hybrid OPC had CNF clumping issues, especially at concentrations above 1 wt % CNFs, and the elastic moduli of the hybrid OPC mortar were often lower than the control specimens. CNFs in the microfine hybrid mortar had inconsistent but inconsequential effects on the elastic modulus, suggesting that the hybrid microfine cement mortar did not have clumping issues and had a more stable dispersion of CNFs.

Example 4

Flexure Prisms

Two 25 mm×25 mm×279 mm mortar flexure prisms using the molds specified in ASTM C490 were tested for each mixture under a 4-point flexure test apparatus using a compression-controlled load frame at a rate of 1 mm/min with data points recorded at 20 Hz (6). Flexure specimens were placed in the 4-point flexure apparatus such that the top of the specimens were 90° to the force plane and the flexure apparatus contacted sides of the specimens that were in contact with the mold; this orientation minimized any error from material settling or bleeding effects that occurred during vibration.

Figure 9:
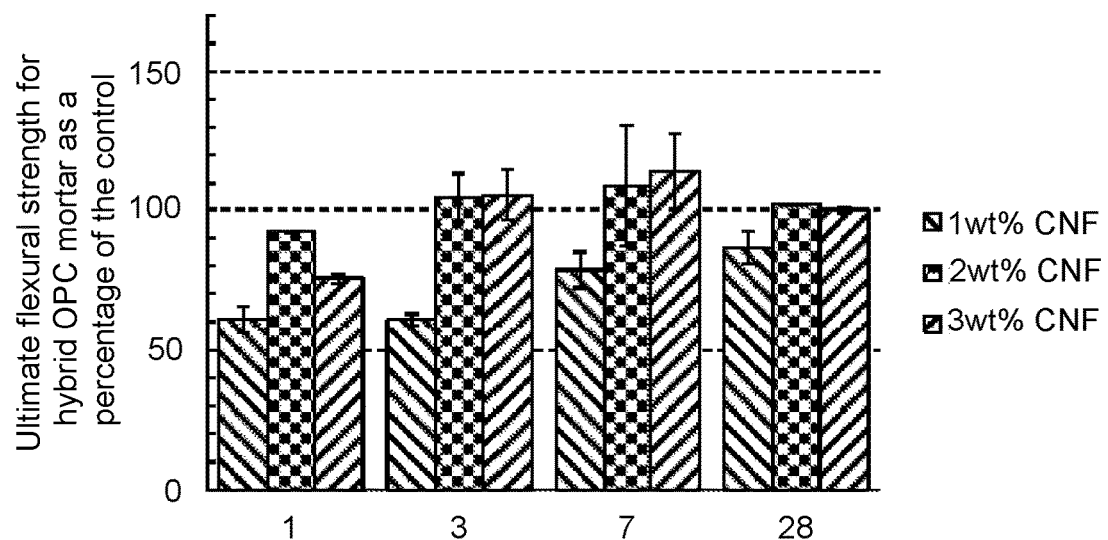
FIG. 9 shows flexural strength results for hybrid OPC mortars as a percentage of the control. Error bars are 0.5*range.
Figure 10:
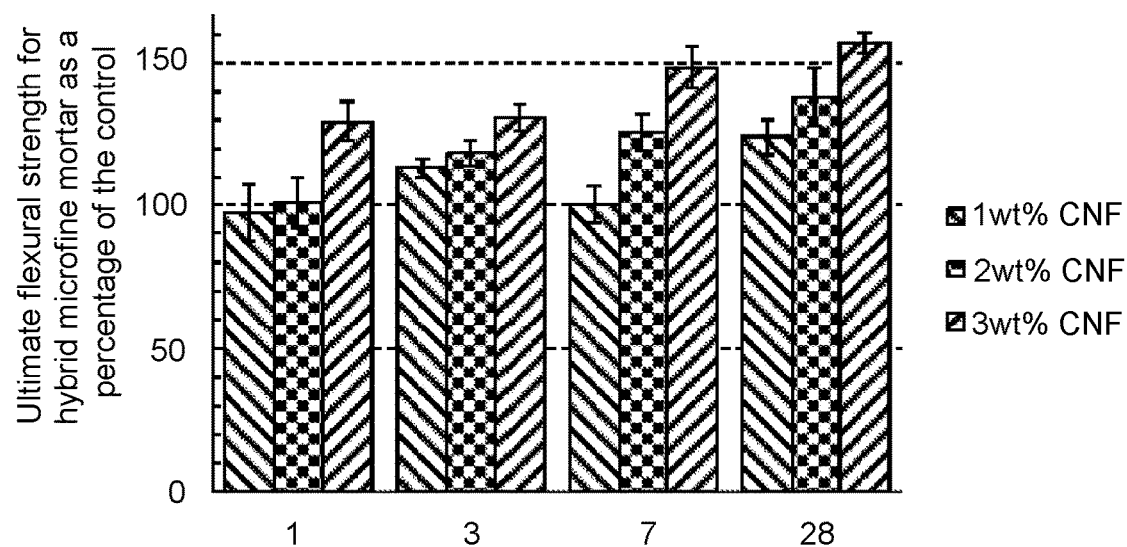
FIG. 10 shows flexural strength results for hybrid microfine cement mortars as a percentage of the control. Error bars are 0.5*range.

The flexure prism ultimate stress for ages 1 day, 3 days, 7 days, and 28 days at various concentrations of CNFS as normalized by the control (FIG. 9 and FIG. 10); i.e. a value of 100% indicates that the specimen had the same flexural strength as the specimen without CNFs. The hybrid microfine cement flexural (FIG. 10) prisms showed a definitive trend that increasing the concentration of CNFs increases the ultimate flexural strength by up to 50%. The hybrid OPC flexural prism strengths (FIG. 9) indicate a reduced strength versus the control for 1 wt % CNFs addition while 2 wt % and 3 wt % additions of CNFs indicate a comparable strength to the control after 3 days age.

The mechanical tests of mortar flexure prisms reinforce the proposition that the dispersion of CNFs is improved in the hybrid microfine cement versus the hybrid OPC. The hybrid OPC had CNF clumping issues, especially at concentrations above 1 wt % CNFs, and the flexural strengths of the hybrid OPC mortar were often lower than the control specimens. CNFs in the microfine hybrid mortar often increased flexural strengths, suggesting that the hybrid microfine cement mortar did not have clumping issues and had a more stable dispersion of CNFs.

Figure 11:
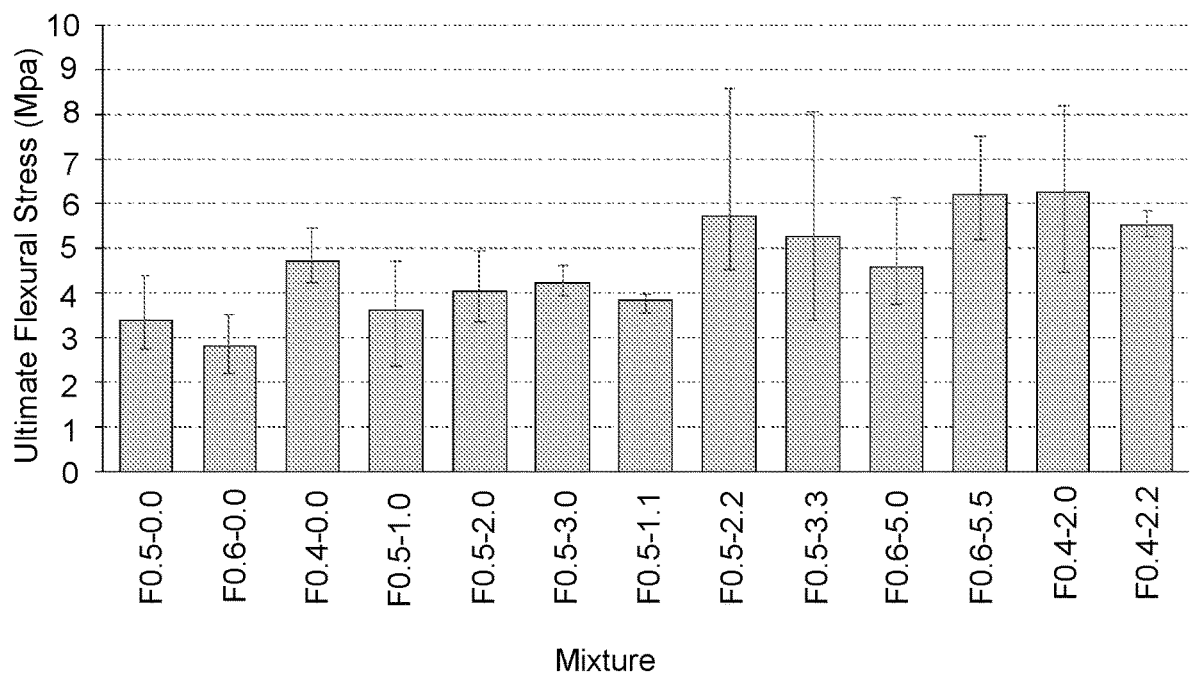
FIG. 11 shows ultimate flexural strength of microfine cement mortar prisms with CNFs and, where applicable, MCMFs. Error bars show the min and max values of the tests.

In the results of 7-day flexural strength tests of microfine cement mortar prisms with CNFs and MCMFs (FIG. 11), four specimens were tested per mixture. Decreasing the w/c ratio from 0.6 to 0.4 (without fibers) increased the ultimate flexural strength from 2.80 MPa to 4.70 MPa. The strongest mixture was F0.4-2.0 with an ultimate strength of 6.26 MPa, follow by F0.6-5.5 with an ultimate strength of 6.18 MPa. The mixture with the highest gain compared to its control w/c ratio mixture was F0.6-5.5 with a 221% increase compared to F0.6-0.0, followed by F0.5-2.2 with a 168% increase compared to F0.5-0.0. The wide margins of error are most likely due to consolidation issues (FIG. 11). The microfine cement mortars were viscous, especially with the addition of high concentrations of fibers or a lower w/c ratio, and it was extremely difficult to remove air voids from the composite. The data suggest that the addition of CNFs and MCMFs to microfine cement mortar can increase the flexural strength by up to 221% (FIG. 11), but workability issues and air voids cause uncertainty in any one particular specimen.

Example 5

Compressive Strength Cylinders

Four cylinders with diameter 22 mm and height 50 mm were prepared for 7-day testing for several mixtures, primarily of microfine cement with various amounts of fibers. Specimens were left in the molds for 24±0.5 hours at 23"C and 98% RH, and then they were soaked in lime water until time of testing. Specimens were uniaxially compressed for each mixture using a displacement-controlled load frame at a rate of 1 mm/min with data points recorded at 20 Hz. The top and bottom of each specimen were cut with a concrete saw to make them smooth and level.

The compressive strength results showed some interesting trends. Adding CNFs increased the compressive strength in mixtures with w/c ratios of 0.4 and 0.5, but mixtures with a w/c ratio of 0.6 had compressive strengths that remained more or less constant with CNFs. Adding MCMFs to the hybrid microfine cement mortars increased the compressive strength in both w/c ratios tested (0.5 and 0.6).

Figure 12:
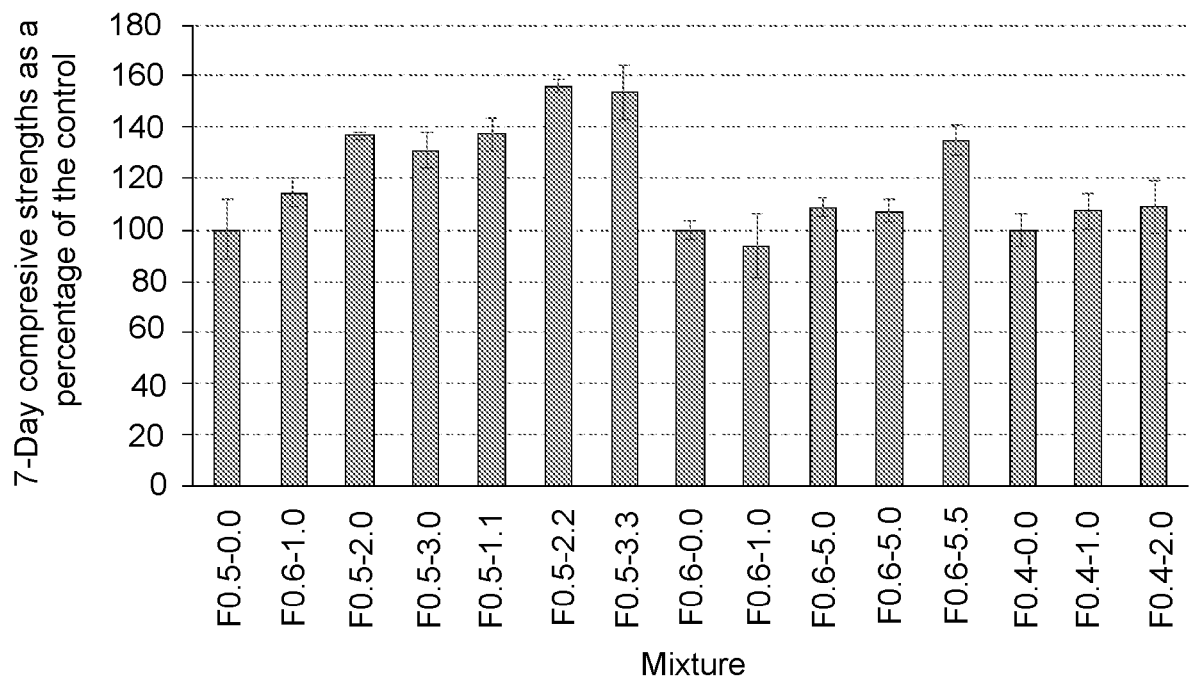
FIG. 12 shows 7-day compressive strengths of hybrid microfine mortars as a percentage of the controls. Error bars are one standard deviation to each side.

The 7-day strengths are used for comparison purposes (FIG. 12). Each mixture has been normalized by the control mixture for that specific w/c ratio, e.g. all F0.5-X.X mixtures are normalized by F0.5-0.0. The mixture with the highest gain is F0.5-2.2 with 56% increased compressive strength, a higher gain than dropping the w/c ratio from 0.5 to 0.4 (43% gain). A statistical analysis was completed on the 7-day compressive strengths using Tukey's method. There were 16 mixtures (OPC0.4-0.0 was included) compared with 4 specimens per mixture, resulting in 48 degrees of freedom. Using a significance value of $\alpha=0.05$, the Tukey's q value is 4.67.

In a comparison of the compressive strengths of all mixtures. If a Tukey score between two mixtures is above the q-value of 4.67, the two mixtures are statistically different with 95% confidence (designated by a highlighted cell). For example, the value in the table is the comparison between mixtures OPC0.4-0.0 and F0.5-0.0; with a value of 0.49<4.67, there is not a significant difference between the compressive strengths of the two mixtures. Comparing the mixtures F0.5-3.3 with F0.5-3.0 has a value of 5.53>4.67, so there is a significant difference between the compressive strengths of the two mixtures. Some interesting aspects of this data are summarized below:

At a w/c ratio of 0.6, the addition of CNFs does not significantly change the compressive strength, but adding MCMFs does significantly increase the compressive strength. At a w/c ratio of 0.5, the addition of 1 wt % CNFs does not significantly change the compressive strength, but the addition of 2 wt % CNFs with or without MCMFs does increase the compressive strength. At a w/c ratio of 0.5, F0.5-2.2 and F0.5-3.3 (the strongest mixtures) are significantly stronger compared to mixtures without MCMFs and F0.5-1.1, but the two mixtures are not significantly different from each other. The mixture OPC0.4-0.0 is not significantly different from the F0.5-0.0 and F0.6-0.0 mixtures, but the F0.4-0.0 mixture is significantly stronger than the OPC0.4-0.0.

Example 6

Izod Impact Strength

Figure 13:
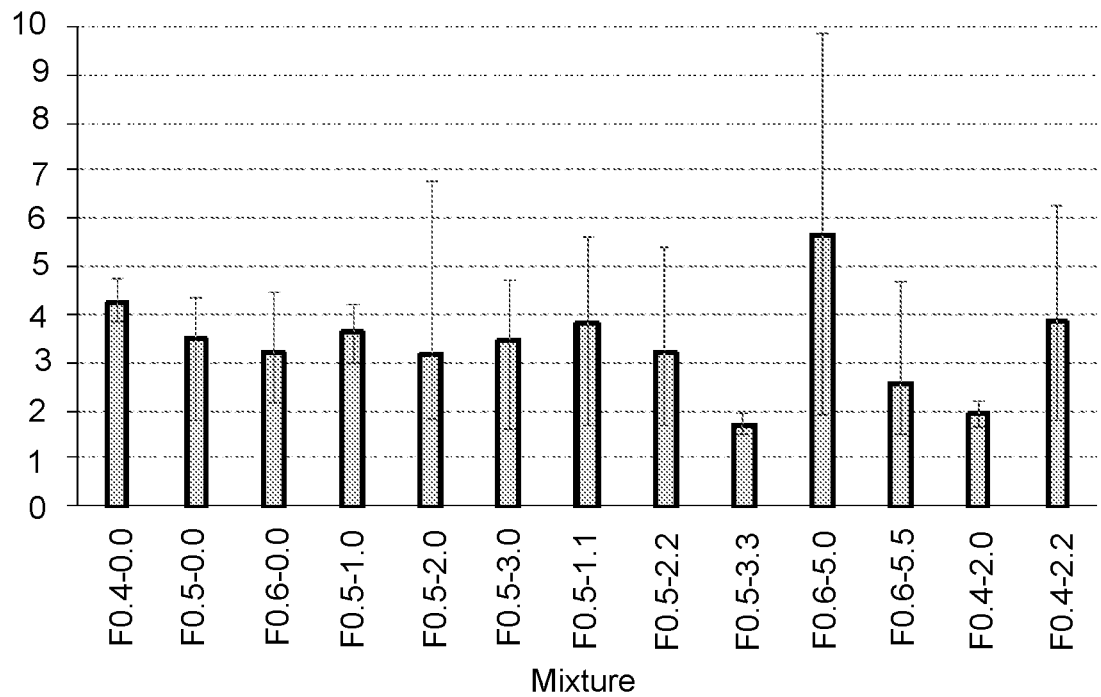
FIG. 13 shows izod fracture energy absorbed per mixture. All mixtures are microfine cement mortar. Error bars show the maximum and minimum values.

Izod impact testing was performed on prisms fabricated using the molds specified in ASTM C490 and cut to a shorter length: 25 mm×25 mm×57 mm (FIG. 13). The Izod impact test is originally designed for plastics but the test is similar to the Charpy impact test and can be performed on many different materials (11). A pendulum hammer drops from a specified height and impacts the sample. The sample is clamped in a cantilever fashion at the base of the machine, and the hammer impacts and fractures the specimen. The initial height of the hammer has a potential energy; at the base of the pendulum swing, all the potential energy has transferred to kinetic energy. The pendulum fractures the sample and rises on the other side of the swing; the height of the pendulum on the up-swing is less than the initial height due to energy loss fracturing the sample. The energy loss fracturing the sample is equivalent to the difference in potential energies of the hammer from initial height to final height in the up-swing. While ASTM D256 calls for a notched sample, an unnotched sample can also be used in the test.

Four 25 mm×25 mm×57 mm microfine cement mortar specimens were tested per mixture, and the results are presented. The control mixtures with no fibers (0.4-0.0, 0.5-0.0, and 0.6-0.0) have decreasing facture energy with increasing w/c ratio as expected, but the mixtures with fibers showed no specific trend. Some mixtures had low fracture energy values compared to the control; the probable cause is excess air in the specimens due to consolidation issues. Other mixtures had higher fracture energy values but with higher ranges as well. For example, mixture 0.6-5.0 had the highest average fracture energy and the largest range; this set of specimens were subject to multiple fractures during the test instead of a single clean break. Multiple fractures in a break can double or triple the fracture energy reported in the Izod test. In conclusion, there is no significant effect of CNFs and MCMFs on fracture energy. Consolidation could have a much larger effect on fracture energy than CNFs or MCMFs.

Example 7

Crack Mouth Opening Displacement Prisms

CMOD tests were performed on microfine cement mortar mixtures with various amounts of CNFs and MCMFs. 25 mm×25 mm specimens were tested in 3-point bending with a gage length of 102 mm and with a 3 mm×4 mm notch cut in the middle of the bottom of the specimen. The load applicator was displacement-controlled at a rate of 0.05 mm/min with data recorded at 100 Hz to ensure proper monitoring of peak and post-peak behavior. The CMOD gauge was attached to knife edges glued to the bottom of the specimen. The CMOD gauge was not calibrated by the manufacturer at the displacements measured, but it could not be compressed to the calibration range since doing so required enough force to alter test results or possibly break the sample before testing; therefore, all values recorded during these tests are qualitative, and the values recorded could be a slight misrepresentation of the actual values. Each test was continued until specimen complete specimen fracture. The mixtures tested were F0.4-0.0, F0.5-0.0, F0.6-0.0, F0.5-1.0, F0.5-2.0, F0.5-3.0, F0.5-1.1, F0.5-2.2, F0.5-3.3, F0.6-5.0, F0.6-5.5, F0.4-2.0, and F0.4-2.2.

The behaviors of the control mixtures at each w/c ratio were shown in FIG. 13. Each mixture showed a rapid reduction in applied force after the peak load, and the specimens failed at ~50 N applied force. A 'rapid failure' is seen in the CMOD results by a lack of data points on specific parts of the curve; for example, the immediate post-peak behaviors of the specimens (FIG. 14) have only a few data points on the falling edge of the curve, indicating the rapid change in Load vs CMOD.

Figure 14:
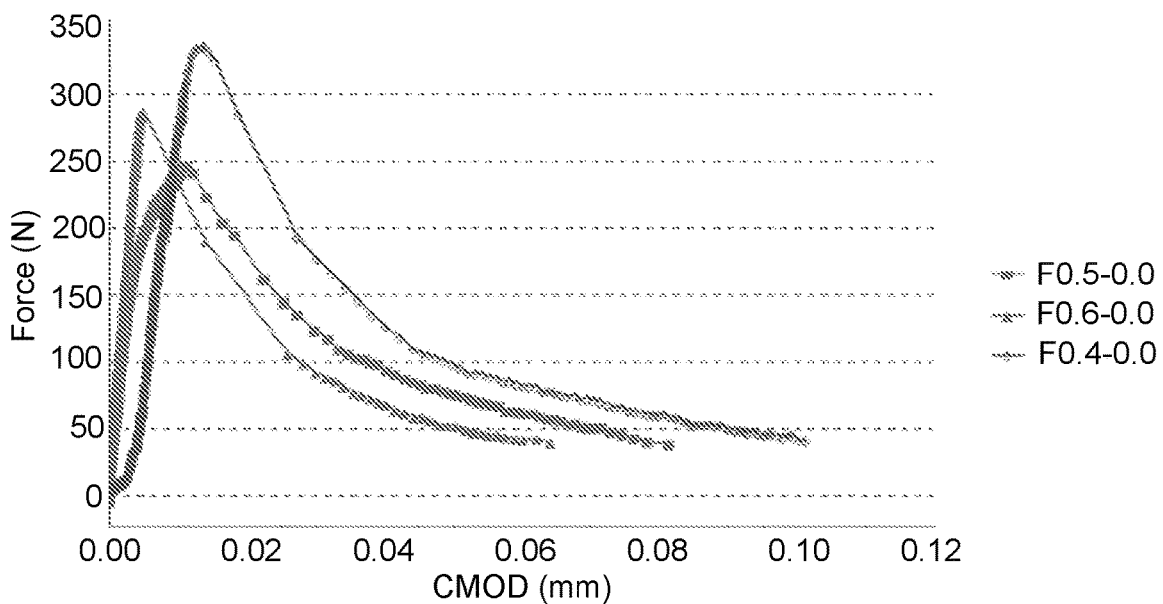
FIG. 14 shows control CMOD mixtures.
Figure 15:
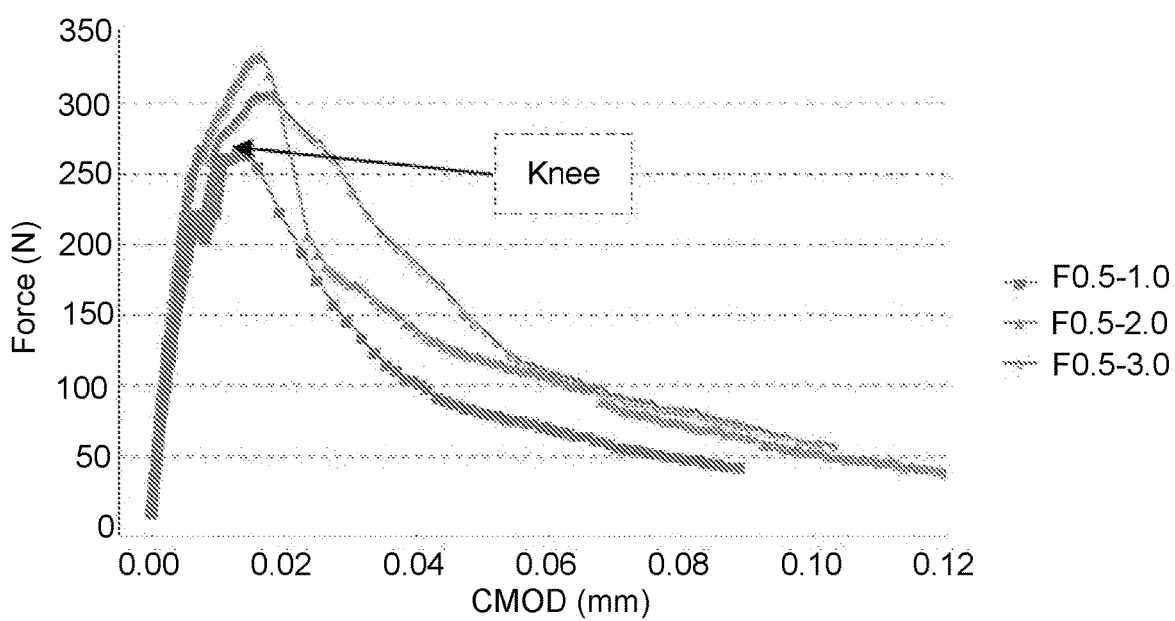
FIG. 15 shows CMOD mixtures with only CNFs and w/c ratios of 0.5.
Figure 16:
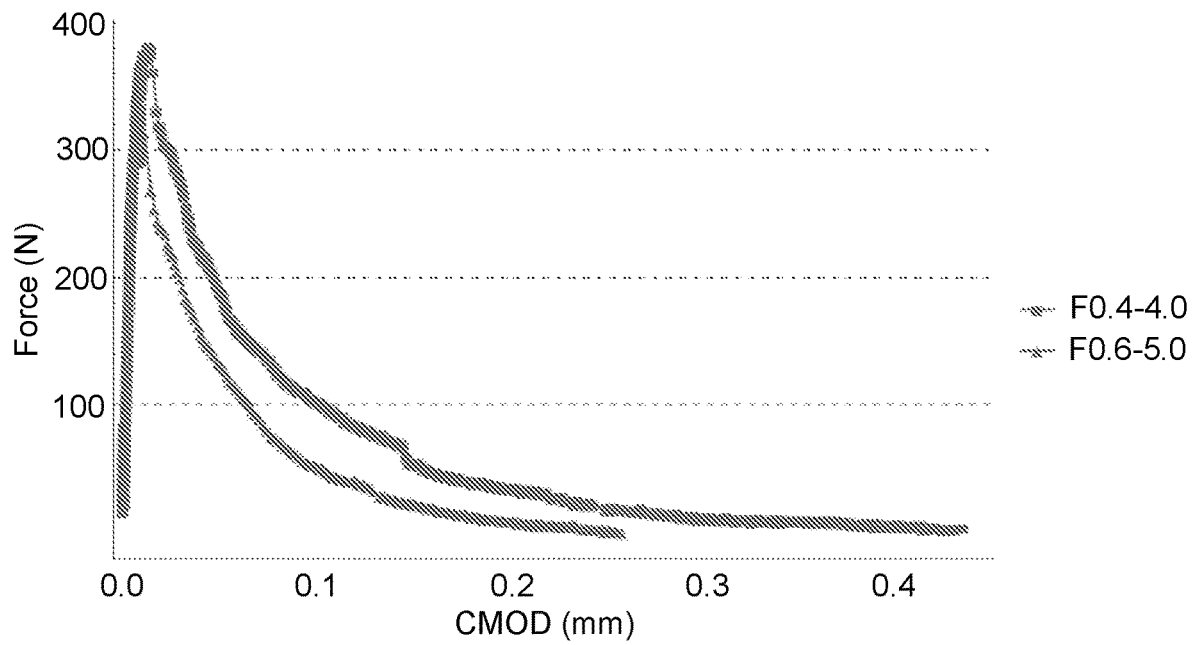
FIG. 16 shows CMOD mixtures with only CNFs and w/c ratios of 0.4 and 0.6.

CMOD test results for mixtures with a w/c ratio of 0.5 and CNFs (without any other fibers) are shown in FIG. 15. Each curve had a segment of rapid change in Load vs CMOD during specimen failure similar to the curves in FIG. 14, but the behavior immediately before and after the peak load is significantly different in the mixtures with 2 wt % and 3 wt % CNFs. In mixtures F0.5-2.0 and F0.5-3.0, there is a bend in the curves resembling the knee shown in the restrained ring drying shrinkage tests shown below. This bend could be the effect of crack-bridging by CNFs during initial composite failure; the cement matrix begins to crack and fail, but the CNFs bridge the cracks and retain the composite's strength though with a lower stiffness (manifesting as a gentler slope in the Load vs CMOD curve). While behavior immediately before and after the peak force is affected by CNF crack bridging, it should be noted that the specimens failed at a CMOD only slightly larger than specimens without CNFs. The post-peak behavior of F0.5-3.0 showed some material difference insofar as the force did not drop as quickly after the peak, suggesting that 3 wt % CNFs did contribute to holding the material together for a narrow crack.

In the results of mixtures with w/c ratios of 0.4 and 0.6 with only CNFs, mixture F0.6-5.0 (FIG. 15) reached a higher peak strain that its control mixture (~350N and ~290N for F0.6-5.0 and F0.6-0.0, respectively) in FIG. 14. More importantly, the specimen held together until a CMOD of ~0.26 mm while the control mixture failed at ~0.064 mm. The result that 1 wt %, 2 wt %, and 3 wt % CNFs did not significantly increase the ultimate CMOD while 5 wt % CNFs did increase the ultimate CMOD suggests that there can be an addition of CNFs high enough to bridge cracks throughout composite failure. Similarly, lowering the w/c ratio to 0.4 increased the load carried post-peak and increased the ultimate CMOD reached before material failure from ~0.11 mm (control mixture) to ~0.45 mm. This result suggests that lowering the w/c ratio could increase the efficacy of the CNFs in the composite in tension.

Figure 17:
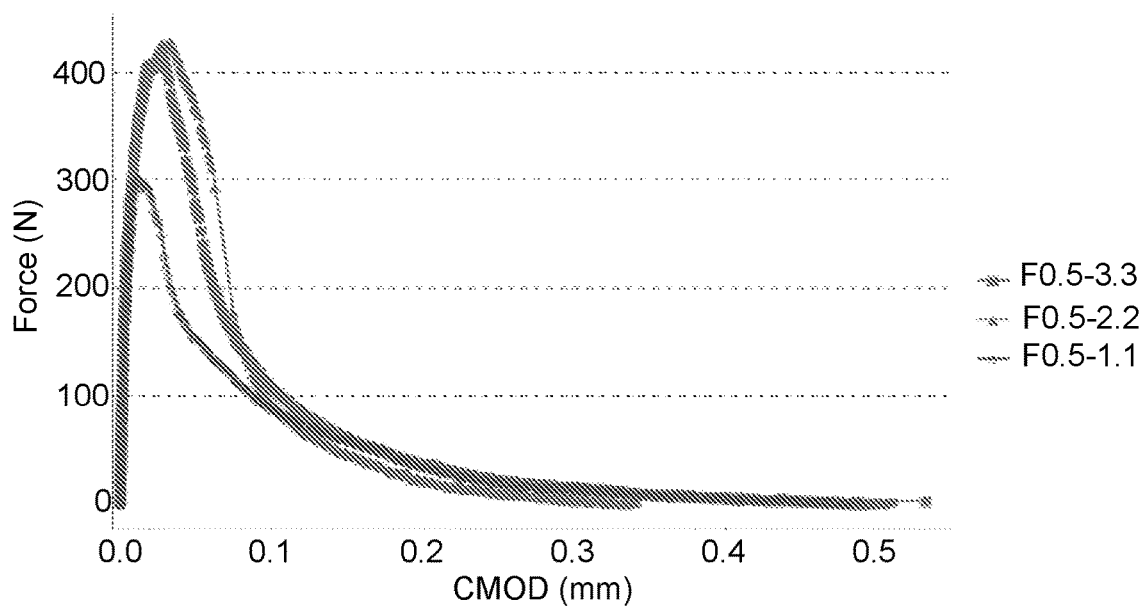
FIG. 17 shows CMOD mixtures with CNFs and MCMFs and w/c ratios of 0.5.

In the results of mixtures with CNFs and MCMFs at a w/c ratio of 0.5. in (FIG. 17), the peak load reached up to ~430N for two of the three specimens shown, though other specimens tested for mixtures with 2 wt % and 3 wt % MCMFs reached the same peak load as the specimens with the same concentration of CNFs but no MCMFs. These results suggest that adding MCMFs in high concentrations (above 1 wt %) can increase the peak load, but the MCMFs do not guarantee that possibility. It could be possible that increasing the concentration of MCMFs higher than 3 wt % would give more consistent results, but more testing is required for definite conclusions on composite behavior consistency. One conclusion that can be deduced is that adding MCMFs to the hybrid CNF mortars does increase the ultimate CMOD and improves post-peak behavior by sustaining load for a longer duration.

Figure 18:
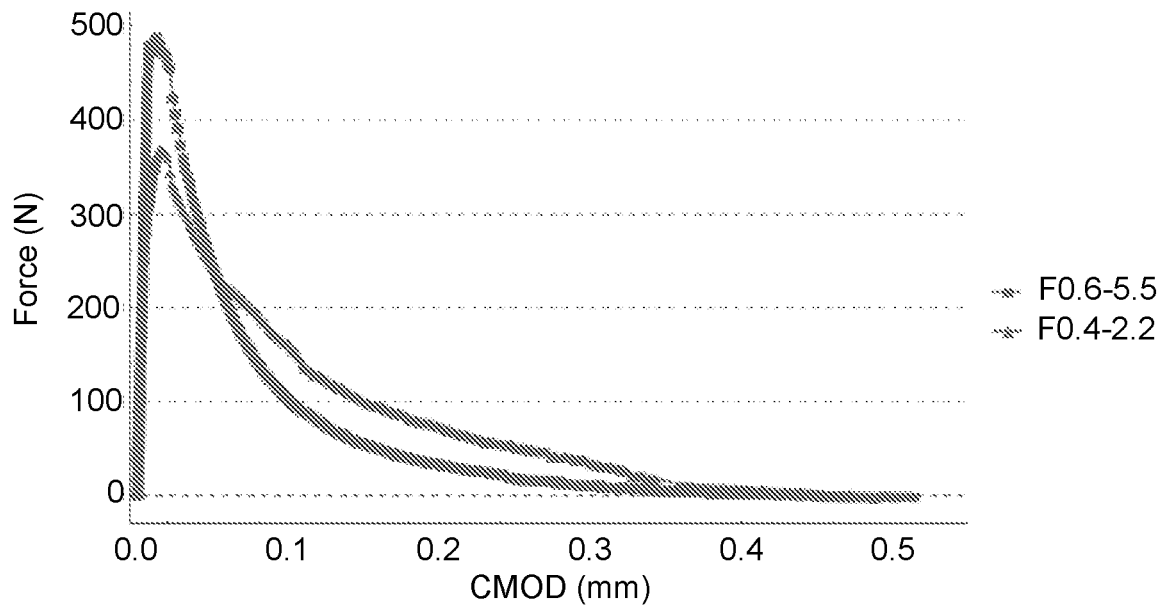
FIG. 18 shows CMOD mixtures with CNFs and MCMFs and w/c ratios of 0.4 and 0.6.

Mixtures of hybrid CNF mortar with MCMFs at w/c ratios of 0.4 and 0.6 are shown in FIG. 18. Mixture F0.4-2.2 reached approximately the same ultimate force as mixture F0.4-2.0 (~360N and ~350N, respectively), but the mixture with MCMFs sustained higher loads as the CMOD increased and reached a higher ultimate CMOD than the mixture without MCMFs. Mixture F0.6-5.5 reached the highest peak load out of all mixtures (~500N) and an ultimate CMOD of ~0.51 mm, but its load capacity vs CMOD fell off more rapidly than did mixture F0.4-2.2. The fact that mixture F0.4-2.2 sustained a higher load (relative to peak load) at larger CMOD suggests that a lower w/c ratio can increase the efficacy of CNF-MCMF hybrid mortars.

Figure 19:
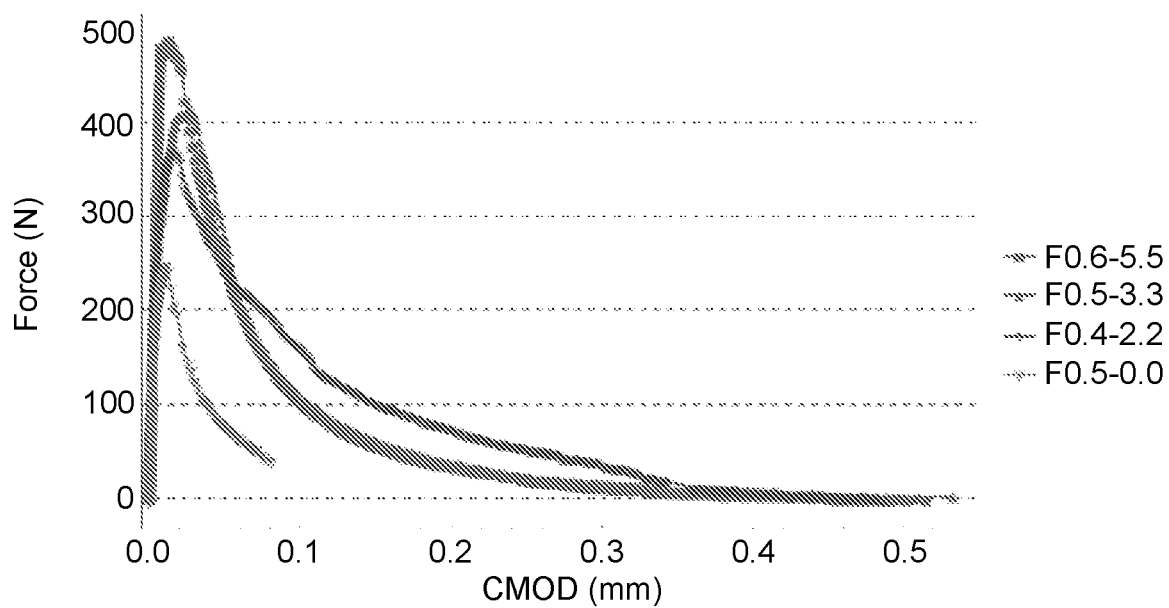
FIG. 19 compares the best CMOD mixtures with the standard mixture.

A comparison of the standard mixture in this research (F0.5-0.0) with three of the best mixtures showed that the highest peak load was achieved with mixture F0.6-5.5 in (FIG. 19). Mixture F0.5-3.3 had similar post-peak behavior to mixture F0.6-5.5 but a lower ultimate load. Mixture F0.4-2.2 sustained higher loads than mixtures F0.6-5.5 and F0.5-3.3 at CMOD greater than ~0.07 mm. The results of the CMOD tests are summarized in Table 2. The toughness of the material in N-mm was calculated by integrating the Force vs CMOD curves. From Table 1, lowering the w/c ratio increases the toughness of the mortar as expected. Adding more than 1 wt % CNF (without MCMFs) also increases toughness. Adding CNFs while lowering the w/c ratio increases toughness in a superposition manner, i.e. the difference in toughness between F0.4-2.0 and F0.4-0.0 is the same as the sum of the differences between 1) F0.4-0.0 and F0.5-0.0 and 2) F0.5-2.0 and F0.5-0.0. Adding MCMFs increased the toughness of all mixtures, though adding more MCMFs did not necessarily increase the toughness in incremental amounts; for example, F0.5-2.2 and F0.5-3.3 had approximately the same toughness and peak load.

TABLE 2

| Mixture | Average peak load (N) | Average ultimate CMOD (MM) | Average toughness (N-mm) |
|---|---|---|---|
| F0.4-0.0 | 342 | 0.108 | 17.1 |
| F0.5-0.0 | 255 | 0.097 | 11.6 |
| F0.6-0.0 | 310 | 0.073 | 9.4 |
| F0.5-1.0 | 265 | 0.079 | 11.6 |
| F0.5-2.0 | 340 | 0.130 | 18.6 |
| F0.5-3.0 | 288 | 0.134 | 17.6 |
| F0.5-1.1 | 297 | 0.533 | 27.6 |
| F0.5-2.2 | 371 | 0.379 | 31.2 |
| F0.5-3.3 | 368 | 0.446 | 30.7 |
| F0.6-5.0 | 358 | 0.306 | 18.6 |
| F0.6-5.5 | 477 | 0.501 | 36.6 |
| F0.4-2.0 | 398 | 0.429 | 29.7 |
| F0.4-2.2 | 362 | 0.512 | 43.1 |

Summary of Examples 1-7

Free drying shrinkage prisms show that OPC and microfine cement with and without CNFs behave in similar fashions but do so at different rates due to the faster hydration of microfine cement. 3 wt % CNFs OPC specimens lose mass and shrink faster than the control. Since hybrid OPC specimens are subject to geometric clustering, the faster mass loss and shrinkage are attributed to a network of interconnected zones containing agglomerations of CNFs that allow water to travel through the specimen to the surface. 3 wt % CNFs microfine cement specimens lose slightly more mass and shrink less than the control. This is attributed to a slight pore coarsening throughout the hybrid specimen, but the pore coarsening is uniform throughout the material and is not due to CNF agglomerations as in hybrid OPC.

Mortar cube elastic moduli results reinforce the proposition that the dispersion of CNFs is improved in the hybrid microfine cement versus the hybrid OPC. The hybrid OPC had CNF clumping issues, especially at concentrations above 1 wt % CNFs, and the elastic moduli of the hybrid OPC mortar were often lower than the control specimens.

CNFs in the microfine hybrid mortar had inconsistent but inconsequential effects on the elastic modulus, suggesting that the hybrid microfine cement mortar did not have clumping issues and had a more stable dispersion of CNFs.

The hybrid OPC had CNF clumping issues, especially at concentrations above 1 wt % CNFs, and the flexural strengths of the hybrid OPC mortar were often lower than the control specimens. CNFs in the microfine hybrid mortar often increased flexural strengths, suggesting that the hybrid microfine cement mortar did not have clumping issues and had a more stable dispersion of CNFs. Flexure prisms with both CNFs and MCMFs suggest that their addition to microfine cement mortar can increase the flexural strength by up to 221%, but workability issues and air voids cause uncertainty in any one particular specimen.

Compressive strength cylinders had several interesting aspects. At a w/c ratio of 0.6, the addition of CNFs does not significantly change the compressive strength, but adding MCMFs does significantly increase the compressive strength by up to 56%; however, dropping the w/c ratio from 0.5 to 0.4 can increase the compressive strength by up to 45%. At a w/c ratio of 0.5, the addition of 1 wt % CNFs does not significantly change the compressive strength, but the addition of 2 wt % CNFs with or without MCMFs does increase the compressive strength. At a w/c ratio of 0.5, F0.5-2.2 and F0.5-3.3 (the strongest mixtures) are significantly stronger compared to mixtures without MCMFs and F0.5-1.1, but the two mixtures are not significantly different from each other. The mixture OPC0.4-0.0 is not significantly different from the F0.5-0.0 and F0.6-0.0 mixtures, but the F0.4-0.0 mixture is significantly stronger than the OPC0.4-0.0.

Izod impact strength tests show that there is no significant effect of CNFs and MCMFs on fracture energy. Consolidation could have a much larger effect on fracture energy than CNFs or MCMFs.

CMOD tests show that adding more than 1 wt % CNF (without MCMFs) increases flexural toughness. Adding CNFs while lowering the w/c ratio increases toughness in a superposition manner. Adding MCMFs increased the toughness of all mixtures, though adding more MCMFs did not necessarily increase the toughness in incremental amounts.

Example 8

Addition of CNFs and MCMFs to OPC on Restrained Drying Shrinkage Resistance

In the ring test results for OPC mortar mixtures (FIG. 20), the OPC mortar rings exhibited the same general trend for all concentrations of CNFs with minor differences in cracking strain, cracking time, and slight variability in the shape of the curves suggesting that the CNFs did not significantly affect the response. The mixtures with 1 wt % CNFs performed worst in terms of cracking time and peak strain, and the poor performance was attributed to the tendency of the mixture to flash set during placement. The mixtures with 2 wt % CNFs cracked at peak strain similar to the control mixtures but at a slightly later time. The time delay in cracking is theorized to be due to the lower stiffness of the material. The mixtures with 3 wt % CNFs reached a slightly higher peak strain as well as delayed cracking time from the control.

The time delay in cracking is again theorized to be primarily caused by the lower stiffness and reduced shrinkage (due to pore coarsening) of the material due to the CNFs and is not attributable to increased ductility. The culmination of these results suggests that the addition of high concentrations of CNFs to OPC mortar does not significantly improve drying shrinkage crack resistance but does open more avenues for detrimental effects such as flash set, mixing difficulties, and possibly higher transport coefficients due to the pore coarsening.

One interesting aspect of the hybrid cements, both OPC and microfine cement, is the color of the final composite. There was a color difference between a plain OPC mortar and a hybrid 2 wt % CNFs mortar. The CNFs caused the mortar, both OPC and microfine cement, to become black. Other fibers types, including high concentrations of MCMFs, did not change the color of the composite.

Example 9

OPC with MCMFs

Figure 20:
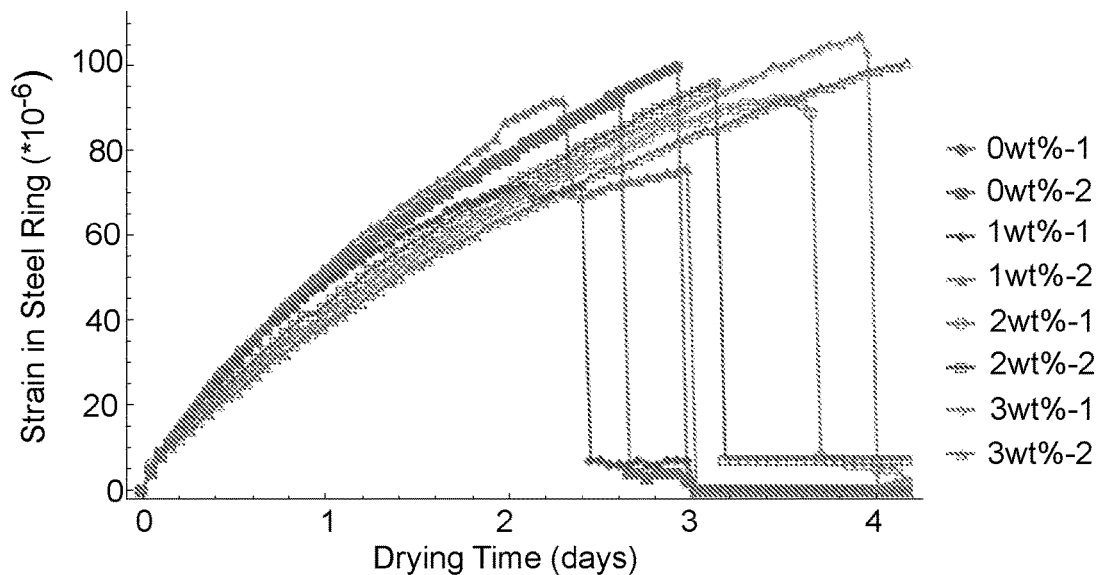
FIG. 20 shows circumferential strain of inner surface of steel ring vs time (days) for OPC mortars with 0 wt % CNFs, 1 wt % CNFs, 2 wt % CNFs, and 3 wt % CNFs. Sample 1 and Sample 2 for a given mixture are designated as '-1' and '-2'.
Figure 21:
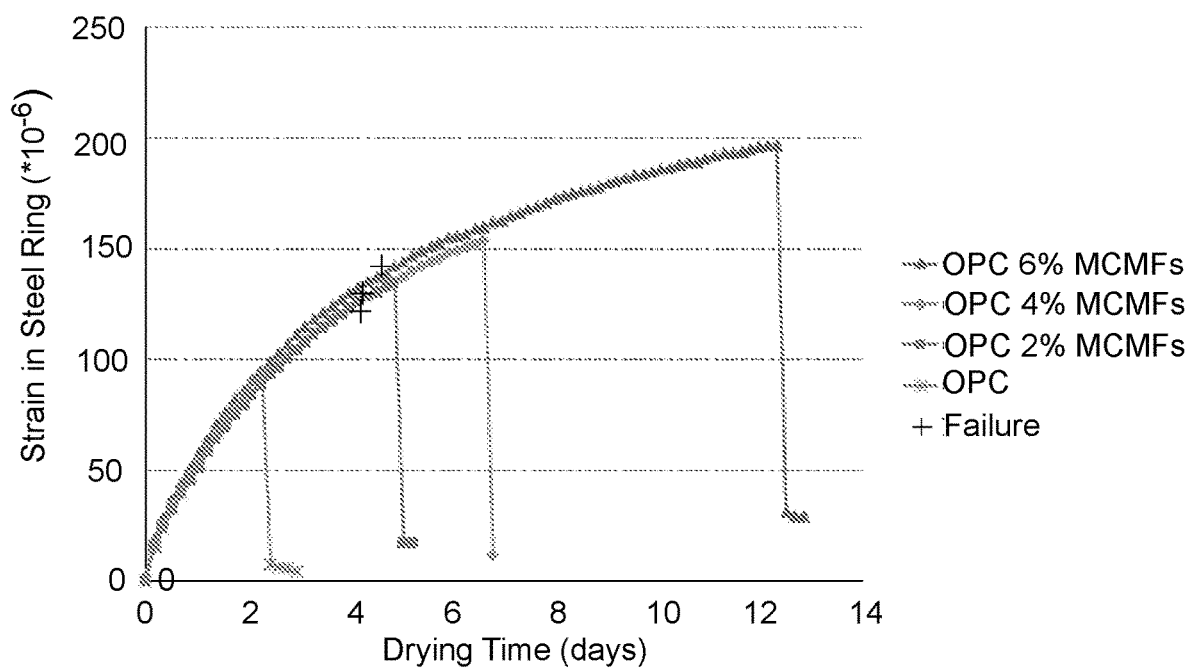
FIG. 21 shows circumferential strain of inner surface of steel ring vs time (days) for OPC mortars with pre-mixed MCMFs

In testing completed for OPC with MCMFs that are pre-mixed with cement by rotary tumbling for 12 hours, some restrained ring shrinkage testing data (FIG. 20). Two specimens of OPC with 2 wt %, 4 wt %, and 6 wt % MCMFs were made for each mixture with a w/c ratio of 0.4 and sand/cement ratio of 1.75. No HRWR was required; there was no obvious change in workability with the addition of 6 wt % MCMFs to the OPC mortar. FIG. 21 shows Adding 2 wt %, 4 wt %, and 6 wt % MCMFs extended the cracking time from 2.32 days to 4.87 days, 6.69 days, and 12.48 days, respectively. The increase factors are 2.1, 2.9, and 5.4 for 2 wt %, 4 wt %, and 6 wt % MCMFs, respectively.

One significant point to be made about OPC mortar with MCMFs is the brittle nature of the composite. PVA and steel fibers are often used in PCBMs because of the significant post-crack ductility added to the composite. MCMFs do not add significant post-crack ductility at concentrations used in this research; the restrained rings cracked and no post-crack behavior was seen that was different from an unreinforced mortar. This behavior is most likely because carbon fibers are more brittle than PVA and steel fibers and do not strain/elongate as much as PVA and steel before fracture.

Restrained drying shrinkage ring tests revealed that the incorporation of CNFs into OPC mortar proved detrimental to the material at worst and marginally beneficial to the material at best. These effects are attributed to 1) the limit of achievable dispersion of CNFs through the matrix due to the size disparity between the CNFs and the OPC grains—i.e., the geometric clustering effect—and 2) to the apparent segregation of CNFs out of dispersion during vibration, which may also be induced by the size disparity of the cement grains and the CNFs. The data presented herein indicates that the effects of adding high concentrations CNFs to OPC mortars are inconsistent and vary from marginally beneficial to detrimental. Restrained drying shrinkage ring tests also revealed that the incorporation of MCMFs into OPC mortar have the potential to delay drying shrinkage cracking time by a factor of up to 5.4 at 6 wt % MCMFs.

Example 10

Microfine Cement with CNFs

Figure 22:
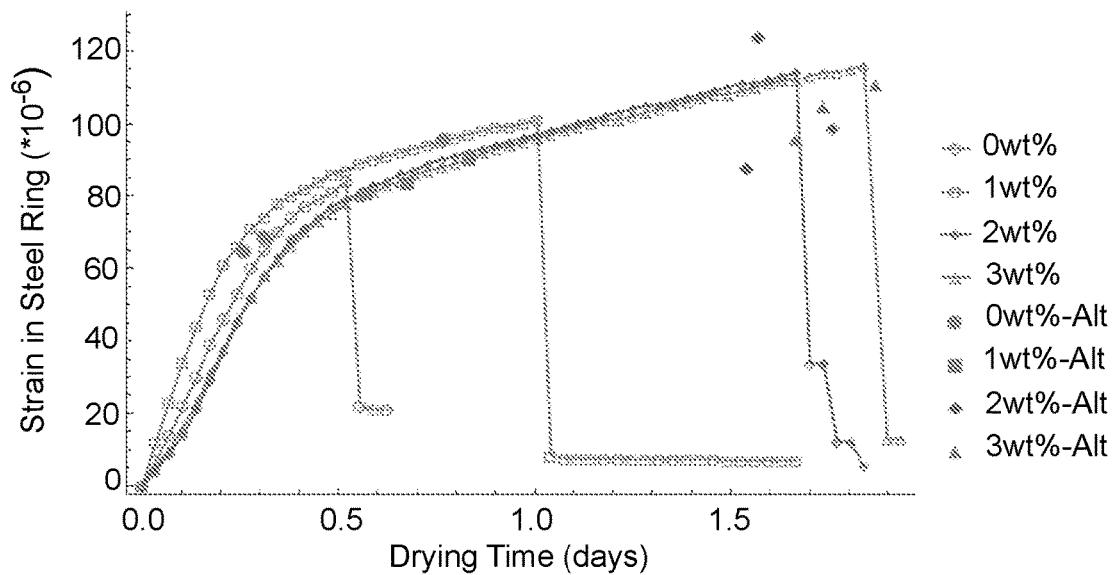
FIG. 22 shows typical circumferential strain of inner surface of steel ring vs time (days) for microfine cement mortars with 0 wt % CNFs, 1 wt % CNFs, 2 wt % CNFs, and 3 wt % CNFs. The term 'Alt' is applied to points that show the failure strain and time of cracking for other specimens.

Ring tests conducted with microfine cement mortar and 0 wt % CNFs, 1 wt % CNFs, 2 wt % CNFS, and 3 wt % CNFs revealed significant differences among the mixtures including peak strain reached, time until cracking, and general strain vs. time graph shape (FIG. 22).

Average peak strain and time of cracking for OPC and microfine cement mixtures were demonstrated. The control microfine cement mortar formed a macrocrack much sooner than the OPC mortar. In addition, the control microfine cement mortar only reached an average of 79 microstrain whereas the OPC mortar rings reached an average of 97 microstrain. The cause of the early macrocrack at a lower strain in the microfine cement mortar is twofold: 1) the microfine cement mortar was much stiffer than the OPC mortar due to faster early-age cement hydration, and 2) the microfine cement mortar had increased drying shrinkage compared to the OPC mortar. Both causes contribute to higher circumferential stresses at the outer radial surface of the mortar.

The control microfine cement mortar is roughly linear until ~60% of its peak strain, at which point its slope begins to drop. The mixtures with 1 wt % CNFs reach an average of 90 microstrain before breaking while also reaching further into what will henceforth be called the 'knee' of the graph: a sudden shift of slope in strain vs. time. The remaining two mixtures, 2 wt % CNFs and 3 wt % CNFs, passed well beyond the knee and sustained much higher strains than the control mixture. Increased dispersion of CNFs in the microfine cement generated more microcrack bridging by CNFs, delaying the formation of a macrocrack. Cracking times were delayed in hybrid microfine mortars by factors of 1.7, 3.5, and 3.9 for 1 wt % CNFs, 2 wt % CNFs, and 3 wt % CNFs, respectively. Peak cracking strain was increased in hybrid microfine mortars by factors of 1.1, 1.3, and 1.4 for 1 wt % CNFs, 2 wt % CNFs, and 3 wt % CNFs, respectively. Thus, the use of microfine cement significantly enhanced the efficacy of CNFs (in comparison to OPC) in extending the cracking time under restrained drying conditions.

Figure 23:
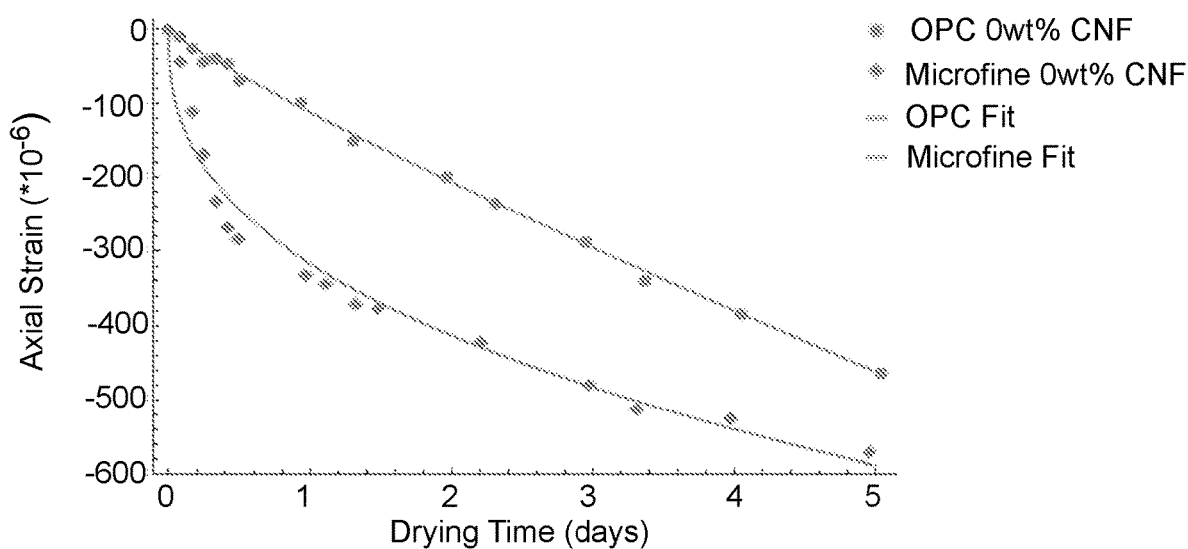
FIG. 23 shows axial free strain curves of OPC and microfine cement control mortars exposed to drying
Figure 24:
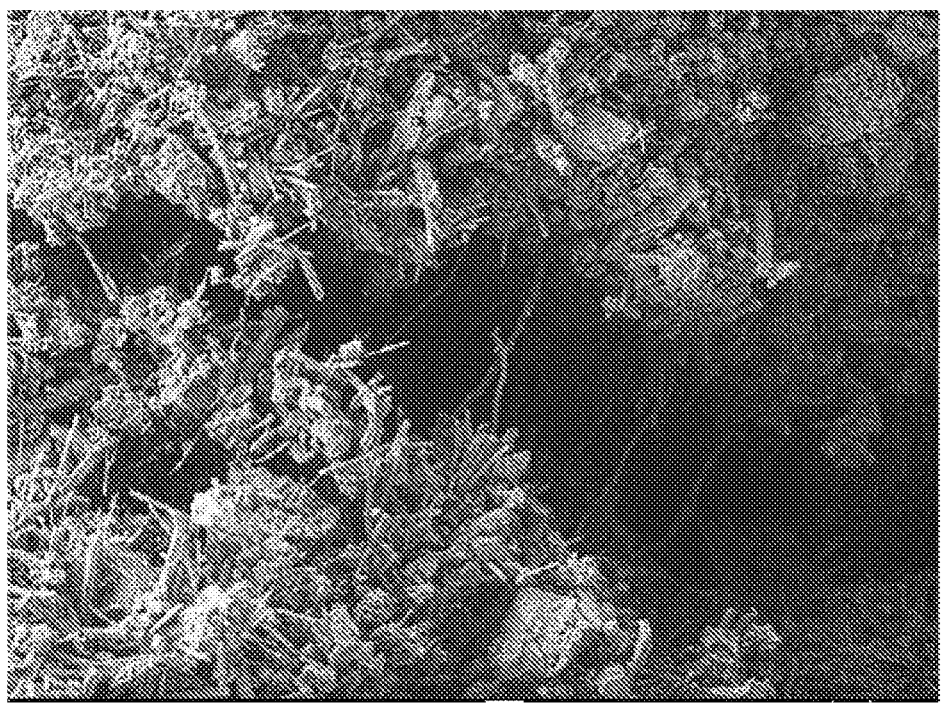
FIG. 24 shows SEM image of hydrated microfine cement mortar showing CNFs bridging a microcrack.
Figure 25:
FIG. 25 shows another SEM image of hydrated microfine cement mortar showing CNFs bridging a microcrack.

The curves in FIG. 23 with OPC and microfine cement mortars have the same basic shape with different fit coefficients, yet the characteristic knee in the ring test data is only seen in the microfine mixtures with CNFs. This finding debunks the hypothesis that the knee in the ring test data is a material property of the microfine cement mortar. The second explanation for the observed ring test data for the microfine cements is that the sudden shift in slope at the knee is due to internal microcracking. In the control mixtures, the mortar begins to crack at the nanometer and micrometer scale, and the microcracks join and form a failure-inducing macrocrack. However, CNFs that are thoroughly dispersed throughout the microfine cement mortars bridge the cracks and hold the material together (FIG. 24 and FIG. 25).

The sudden shift in slopes in the strain vs. time curves in microfine mortar mixtures with CNFs are thus theorized to be the result softening caused by the switch from an 'undamaged' material to a 'damaged' material (FIG. 22). The strain behavior in the time period prior to the knee in each mixture was dominated by the properties of the mortar matrix of sand and hydrated cement since all microfine mortar mixtures behaved in a similar manner, though there was some difference in slope due to different stiffness, different drying rates, and possible creep or viscoelastic effects. During the knee, it is proposed that each mixture began developing microcracks that damaged the integrity of the mortar matrix, a theory reinforced by the data (FIG. 22) wherein the knee began forming at approximately the same strain for all mixtures regardless of maximum strain reached. Eventually, the proliferation of microcracks in the mortar matrix reached a damage threshold and subsequently resulted in the formation of a macrocrack in the control microfine cement mortar mixtures. The microfine cement hybrid mortar mixtures, however, were able to sustain the damage due to crack bridging by the well-dispersed CNFs, and the existing microcracks could not propagate to form a macrocrack until more damage was induced. This formation of microcracks bridged by CNFs changed the apparent macro-mechanical properties of the mortar during the knee of the graph, e.g. apparent stiffness and drying shrinkage rates, resulting in the observed sudden shift in slopes in the strain vs. time curves. The maximum strain reached and time of cracking, and therefore the amount of damage required to induce a macrocrack, in the microfine mortar mixtures had significant gains between the control mixture, 1 wt % CNFs, and 2 wt % CNFs, but the furtherance from 2 wt % CNFs to 3 wt % CNFs exhibited a diminishing return. Cracking times, measured from the initiation of drying, were delayed by factors of 2.0, 5.5, and 5.7 for 1 wt % CNFs, 2 wt % CNFs, and 3 wt % CNFs, respectively.

Example 11

Microfine Cement with CNFs and/or MCMFs

The previous section describes the success in attaining crack bridging by CNFs in microfine cement mortar. Whether the cracking resistance of the hybrid cement could be enhanced by incorporating microfibers in addition to CNFs was examined. The general theory of multi-scale fiber reinforcement without the formation of a macrocrack is based on the idea that crack bridging by CNFs would cause an apparent macrostrain. In essence, microcracks form in the cement matrix but are held together by the CNFs and do not propagate together; the formation of thousands of microcracks can manifest in the composite as an apparent macrostrain. It is well known that microfibers enhance mechanical properties in PCBMs by crack bridging, but the cracks that form in FRC are easily seen with the unaided eye; this is true because fibers (both CNFs and microfibers) need the material to strain before adding significant properties. CNFs add strength and cracking resistance much sooner than microfibers due to their size; CNFs are ~100× smaller than microfibers, and therefore they require less strain in the cement matrix to become effective. Since the hybrid microfine cement mortar has increased cracking resistance, it is possible that the apparent macrostrain given by CNF crack bridging may be enough to engage microfibers without the formation of a macrocrack.

Preliminary restrained rig drying shrinkage testing was conducted with PVA microfibers in the hybrid microfine cement mortars; the composite showed the same behavior as in (FIG. 22) with some post-crack behavior, but the macrocrack still formed before the PVA microfibers had any effect. Upon inspection of the cracked composite, it was found that the PVA fibers were not thoroughly distributed. Since PVA fibers are too large to be included in the sonication/distillation technique used for CNF dispersion, a different type of fiber was used for the multi-scale fiber reinforcement testing.

MCMFs are ~5× smaller in diameter than PVA microfibers, but they are also ~80× shorter. While PVA microfibers resemble clumps of hair, MCMFs are so small that they are seen as a black powder. The MCMFs were added to the hybrid CNF microfine cement during sonication, and the addition of MCMFs did not have any significant effect on the workability of the mixtures.

Plain microfine cement mortar, 1 wt % CNFs, 2 wt % CNFs, and 3 wt % CNFs have been seen in a prior section. 5 wt % CNFs microfine cement mortar required a w/c ratio of 0.6 to be mixed due to the extremely high water demand, and no amount of superplasticizer in a w/c ratio of 0.5 would make the mixture liquid-like. The knee in the 5 wt % CNFs mixture occurs at a much lower strain than the 0.5 w/c ratio mixtures due to an inherently weaker cement matrix, but the high concentration of CNFs enables the composite material to delay the formation of a macrocrack and sustain a high microstrain than its 0.5 w/c ratio CNF companions. In addition to CNF hybrid composites, a mixture was made with only MCMFs in microfine cement mortar (dispersed using the same alcohol/sonication technique). The material performed in a similar manner to mixtures with CNFs in that the curve had a knee.

Figure 26:
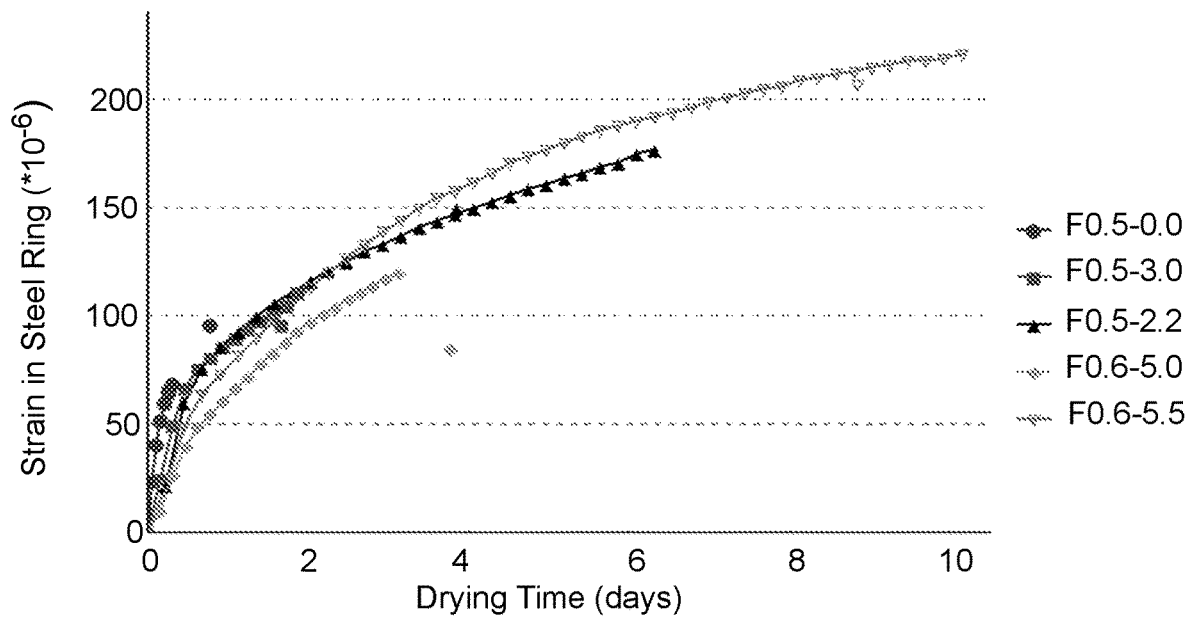
FIG. 26 shows F0.5-2.2 and F0.6-5.5 compared to previous results.

The first test run with the combination of both CNFs and MCMFs in microfine cement mortar was 2 wt % CNFs and 2 wt % MCMFs as shown in FIG. 26. The 2 wt % CNFs 2 wt % MCMFs mixture initially behaved the same as the 2 wt % CNFs mixture, but the mixture remained intact (no macrocrack) for 6.48 days after exposure to 50% RH and reached 178 microstrain in the steel. The time delay in cracking of the 2 wt % CNFs 2 wt % MCMFs mixture is a factor of 14.1, 3.6, and 2.1 compared to plain microfine cement mortar, 3 wt % CNFs, and 5 wt % CNFs, respectively. The combination of CNFs with MCMFs in the material provided benefits that were greater than the sum of the individual benefits from CNFs or MCMFs alone. Another test using 5 wt % CNFs 5 wt % MCMFs proved even greater benefits with a peak microstrain of 222 and a macrocrack formation delay of 10.2 days (time delay factor of 22.2).

Figure 27:
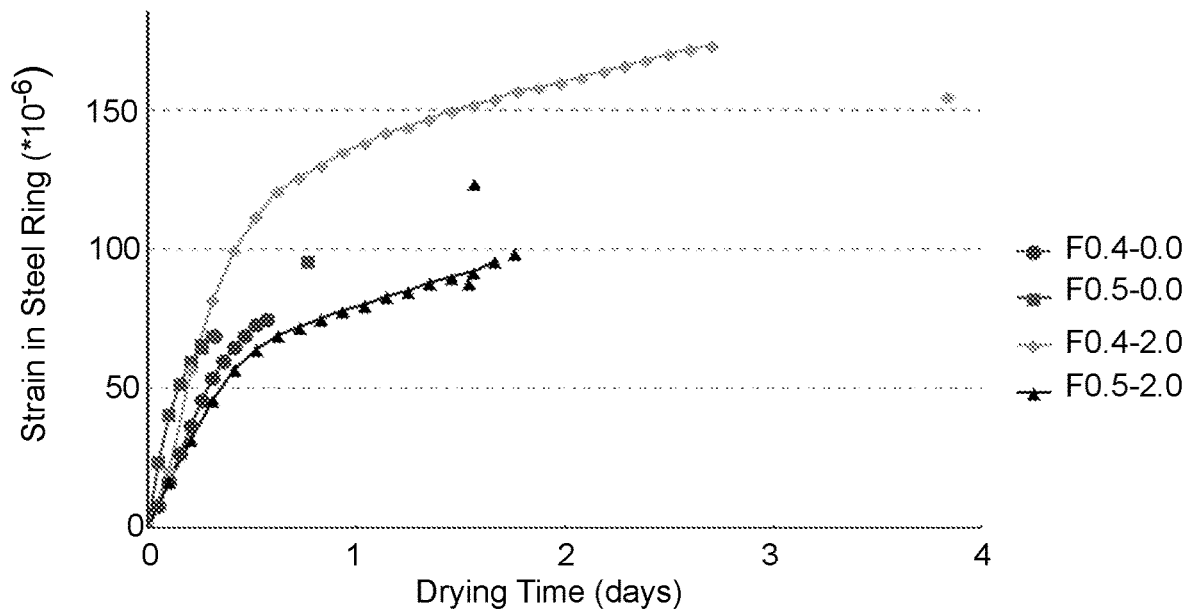
FIG. 27 shows Restrained ring drying shrinkage tests with 0.4 w/c ratio.

The next step in determining the effects of multi-scale fiber reinforcement on hybrid microfine cement mortars was to drop the w/c ratio to 0.4. A major setback in attempting to drop the w/c ratio is workability issues. The high water demand of the hybrid microfine cement mortar required high doses of HRWR, and dropping the w/c ratio while incorporating CNFs severely inhibited workability. The effects of dropping the w/c ratio from 0.5 to 0.4 with plain microfine cement mortar and a 2 wt % CNFs mixture were examined (FIG. 27). The plain mortar with a 0.4 w/c ratio had similar behavior compared to the plain mortar with a 0.5 w/c ratio. However, adding 2 wt % CNFs to the 0.4 w/c ratio microfine cement mortar improved the cracking resistance both in terms of ultimate microstrain reached and time until cracking.

Figure 28:
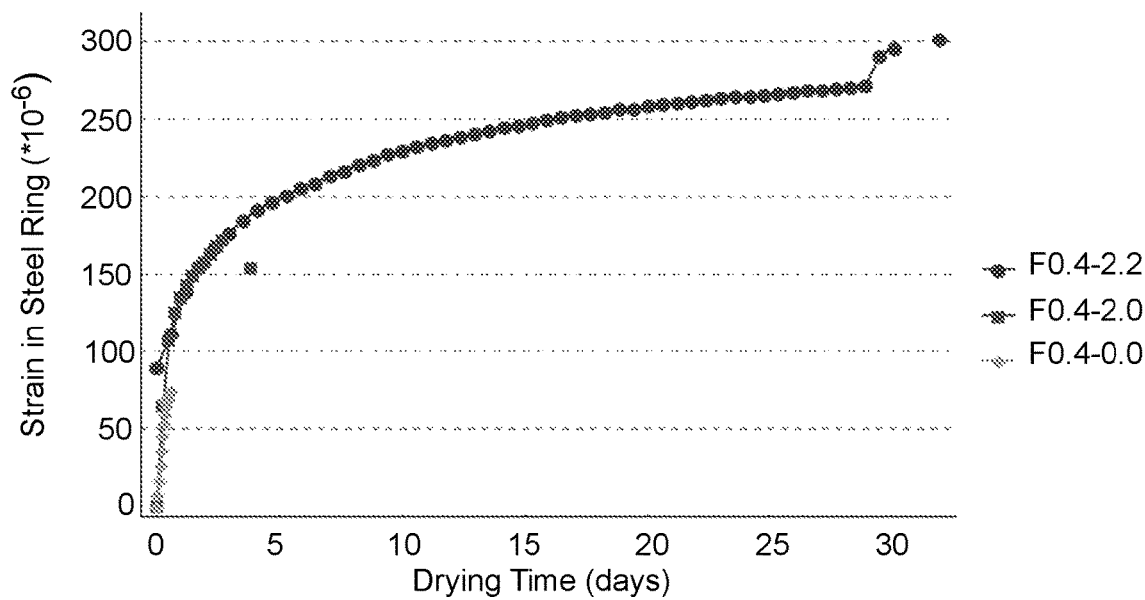
FIG. 28 shows restrained ring drying shrinkage tests with 0.4 w/c ratio. The RH was dropped to 35% at ~29 days to break the specimens.

An experimental oddity occurred in the F0.4-2.2: the microstrain in the steel remained at 0 until ~0.8 days. The shape of the resulting curve resembled the behavior of the control mixture (F0.4-2.0) but at a higher microstrain; therefore, F0.4-2.2 was shifted up by 90 microstrain in post-processing to match data with the control mixture as shown in FIG. 28. After the specimen was subjected to 50% RH for 29 days with no formation of a macrocrack, the RH was dropped to 35% to break the specimen. The specimen formed a macrocrack at 31.2 days and 301 microstrain in the steel, a time delay factor of 50.5 and a microstrain increase factor of 3.91. By combining CNFs and MCMFs with microfine cement, the cracking resistance of the composite was increased by over 5,200% compared to the control mixtures.

Example 12

Microfine Cement with CNFs, MCMFs, and Other Fibers

Figure 29:
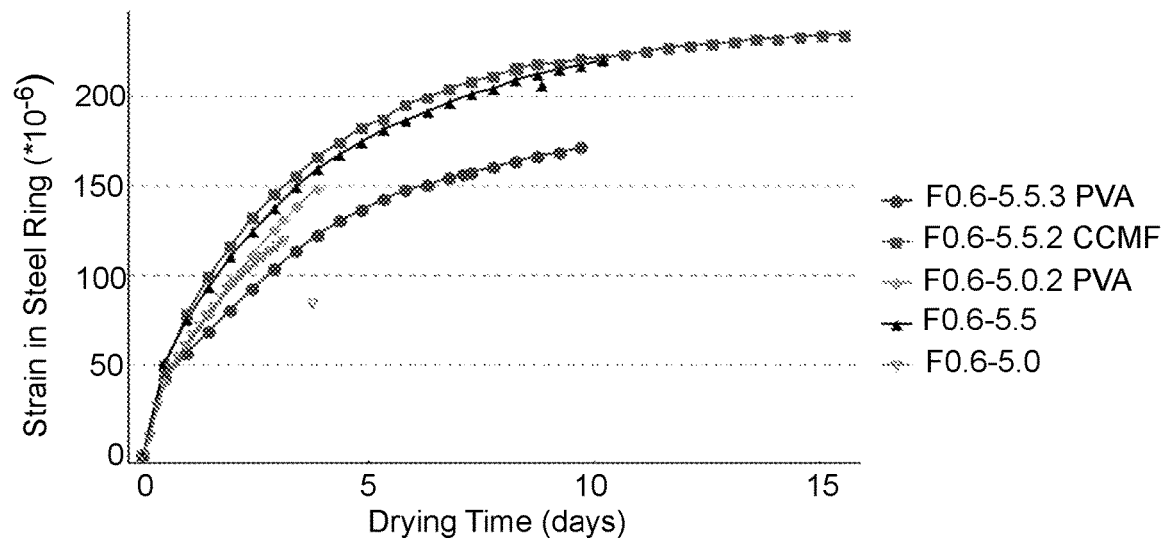
FIG. 29 shows restrained ring drying shrinkage tests with larger microfibers.

Hybrid microfine cement mortars with and without MCMFs were subjected to restrained ring drying shrinkage tests with longer microfibers (FIG. 29). Adding PVA fibers to a 5 wt % CNFs mixture added some benefits to ultimate microstrain and time delay in cracking, but the improvements were not as notables as what has been seen combining CNFs with MCMFs. Adding 3 wt % PVA fibers to a 5 wt % CNFs 5 wt % MCMFs mixture increased time delay in cracking but did not greatly influence ultimate microstrain (compared to 5 wt % CNFs 2 wt % PVA). It should be noted that PVA fibers do not separate as well as CCMFs during mixing and have the tendency to form clumps. Adding CCMFs to the mixtures with 5 wt % CNFs 5 wt % MCMFs did not significantly effect ultimate microstrain but extend time delay until cracking from ~10 days to ~15 days. There were no clumps of CCMFs in the fresh mixture or the final composite. It should be noted that the CCMFs were prone to fracture during composite break rather than fiber pullout, and the macrocrack that formed in mixtures without PVA fibers had few if any fibers bridging the macrocrack.

Summary of Examples 8-12

Restrained drying shrinkage ring tests revealed that the incorporation of CNFs into OPC mortar proved detrimental to the material at worst and marginally beneficial to the material at best. These effects are attributed to 1) the limit of achievable dispersion of CNFs through the matrix due to the size disparity between the CNFs and the OPC grains—i.e., the geometric clustering effect—and 2) to the apparent segregation of CNFs out of dispersion during vibration, which may also be induced by the size disparity of the cement grains and the CNFs. The data presented herein indicates that the effects of adding high concentrations CNFs to OPC mortars are inconsistent and vary from marginally beneficial to detrimental. Restrained drying shrinkage ring tests also revealed that the incorporation of MCMFs into OPC mortar have the potential to delay drying shrinkage cracking time by a factor of up to 5.4 at 6 wt % MCMFs, but further research is needed to solidify the results and to determine the cause of flaws in the material.

The sudden shift in slopes in the strain vs. time curves in microfine mortar mixtures with CNFs are theorized to be the result softening caused by the switch from an 'undamaged' material to a 'damaged' material. The strain behavior in the time period prior to the knee in each mixture was dominated by the properties of the mortar matrix of sand and hydrated cement. During the knee, it is proposed that each mixture began developing microcracks that damaged the integrity of the mortar matrix. Eventually, the proliferation of microcracks in the mortar matrix reached a damage threshold and subsequently resulted in the formation of a macrocrack in the control microfine cement mortar mixtures. The microfine cement hybrid mortar mixtures, however, sustained the damage due to crack bridging by the well-dispersed CNFs, and the existing microcracks could not propagate to form a macrocrack until more damage was induced.

The addition of MCMFs to the hybrid CNF microfine cement increased shrinkage cracking resistance more than the sum of the benefits from CNFs or MCMFs alone. It is considered that cement matrix microcracking is bridged by CNFs, creating an apparent macrostrain in the composite that enables microfibers to add cracking resistance to the composite before the microcracks can propagate to form a macrocrack. Fiber composites of up to 5 wt % CNFs and 5 wt % MCMFs were successfully created and significantly increased the drying shrinkage cracking resistance of the composite. A summary of the results of the restrained ring drying shrinkage cracking tests in given in Table 3. The mixture used in this research with the greatest shrinkage cracking resistance was a hybrid microfine cement mortar F0.4-2.2; the time delay in cracking was increased by a factor of ~52, and the ultimate microstrain in the steel ring was increased by a factor of ~3.9.

TABLE 3

| Cement Type | W/C Ratio | CNFs (wt %) | MCMFs (wt %) | Other Fiber Type | Other Fiber (wt %) | Cracking Time (days) | Cracking Microstrain ($\mu\varepsilon$) | Cracking Time Factor** |
|---|---|---|---|---|---|---|---|---|
| OPC | 0.4 | 0 | 0 | — | — | 2.2 | 89 | — |
| OPC | 0.5 | 0 | 0 | — | — | 2.8 | 97 | — |
| OPC | 0.5 | 1 | 0 | — | — | 2.7 | 73 | 0.96 |
| OPC | 0.5 | 2 | 0 | — | — | 3.4 | 94 | 1.2 |
| OPC | 0.5 | 3 | 0 | — | — | 4.1 | 102 | 1.5 |
| MF | 0.5 | 0 | 0 | — | — | 0.5 | 79 | — |
| MF | 0.5 | 1 | 0 | — | — | 0.8 | 89 | 1.6 |
| MF | 0.5 | 2 | 0 | — | — | 1.6 | 106 | 3.2 |
| MF | 0.5 | 3 | 0 | — | — | 1.8 | 107 | 3.6 |
| MF | 0.6 | 5 | 0 | — | — | 3.2 | 121 | 6.4 |
| MF | 0.7 | 5 | 0 | — | — | 3.3 | 102 | 6.6 |
| MF | 0.5 | 2 | 2 | — | — | 6.5 | 179 | 13 |
| MF | 0.6 | 5 | 5 | — | — | 10.2 | 222 | 20 |
| MF | 0.5 | 0 | 2 | — | — | 1.3 | 112 | 2.6 |
| MF | 0.4 | 0 | 0 | — | — | 0.6 | 77 | — |
| MF | 0.4 | 2 | 0 | — | — | 2.7 | 174 | 4.5 |
| MF | 0.4 | 2 | 2 | — | — | 31.2* | 301* | 52 |
| MF | 0.6 | 5 | 5 | CCMF | 2 | 15.6 | 235 | 31 |
| MF | 0.6 | 5 | 5 | PVA | 3 | 10.2 | 172 | 20 |
| MF | 0.6 | 5 | 0 | PVA | 2 | 4.2 | 155 | 8.4 |

*The RH was dropped from 50% to 35% to end the test sooner due to time constraints on the equipment.
**Calculated as the ratio of (mixture cracking time)/(control mixture cracking time)

The following references are cited herein:
1. Bazant et al. ACI Materials Journal, vol. 84, pp. 351-357, 1987.
2. Aveston et al., J Mat Sci., vol. 8, pp. 352-362, March 1973 1973.
3. Benturet et al., Fiber Reinforced Cementitious Composites: Elsevier Science Publishers LTD, 1990.
4. Smilauer et al., Acta Polytechnica, vol. 52, pp. 22-28, 2012.
5. Makar et al. 3rd International Conference on Construction Materials: Performance, Innovations and Structural Implications, Vancouver, B. C., 2005.
6. ASTM, "ASTM C490: Standard Practice for Use of Apparatus for the Determination of Length Change of Hardened Cement Paste, Mortar, and Concrete," ASTM International, 2011.
7. Hajibabaee et al., Cement and Concrete Research, vol. 79, pp. 151-158, 2016.
8. Grasley, American Concrete Institute, vol. 270, pp. 17-32, 2010.
9. Grasley et al. Cement and Concrete Research, vol. 41, pp. 77-89, 2011.
10. ASTM, "ASTM C109: Standard Test Method for Compressive Strength of Hydraulic Cement Mortars," ASTM International, 2016.
11. ASTM, "ASTM D256: Standard Test Methods for Determining the Izod Pendulum Impact Resistance of Plastics," ASTM International, 2010.

One skilled in the art will readily appreciate that the present invention is well adapted to carry out the objects and obtain the ends and advantages mentioned, as well as those inherent therein. It will be apparent to those skilled in the art that various modifications and variations can be made in practicing the present invention without departing from the spirit or scope of the invention. Changes therein and other uses will occur to those skilled in the art which are encompassed within the spirit of the invention as defined by the scope of the claims.

What is claimed is:

1. A fiber reinforced cementitious material with increased crack resistance, consisting of:
a premixture of a microfine cement and carbon nanofibers or carbon microfibers or a combination thereof; and
water.

2. The fiber reinforced cementitious material of claim 1, wherein the microfine cement is a microfine Portland cement.

3. The fiber reinforced cementitious material of claim 1, wherein the carbon microfibers are milled carbon microfiber or chopped carbon microfibers or a combination thereof.

4. The fiber reinforced cementitious material of claim 3, wherein the carbon nanofibers are each about 5 nanometers to about 150 nanometers in diameter and about 5 micrometers to about 200 micrometers in length.

5. The fiber reinforced cementitious material of claim 3, wherein the carbon microfibers are each about 3 micrometers to 15 micrometers in diameter and ranges from less than 1 millimeter to greater than 15 millimeters in length.

6. The fiber reinforced cementitious material of claim 1, wherein the carbon nanofibers or the carbon microfibers are 15% or less by weight of the microfine cement.

7. The fiber reinforced cementitious material of claim 1, wherein the cementitious material has an increased resistance to cracking due to restrained drying shrinkage, bridges microcracks and delays formation of macro cracks, and has a high flexure strength, an increased compressive strength and an increased impact toughness.

8. The fiber reinforced cementitious material of claim 7, wherein the cementitious material has an increased cracking resistance of at least 5,200% without loss to flexure strength, compressive strength or impact toughness.

9. A fiber reinforced mortar, consisting of:
the premixture of claim 1;
an aggregate material;
a chemical admixture; and
water.

10. The fiber reinforced mortar of claim 9, wherein the aggregate material is sand, gravel or crushed stone or a combination thereof.

11. The fiber reinforced mortar of claim 9, wherein the chemical admixture comprises a polycarboxylate high-range water reducer (HRWR) or a sucrose-based retarder or a combination thereof.

12. The fiber reinforced mortar of claim 11, wherein the chemical admixture is 4% or less by weight of the microfine cement.

13. A fiber reinforced cementitious mixture with an increased resistance to cracking, consisting of:
- a premixture of carbon nanofibers and a microfine cement at 15% or less by weight of the cement per the carbon nanofibers; and
- at least one of water, an aggregate material or a chemical admixture.

14. The fiber reinforced cementitious mixture of claim 13, wherein the microfine cement is a microfine Portland cement.

15. The fiber reinforced cementitious mixture of claim 14, wherein the carbon nanofibers are each about 5 nanometers to about 150 nanometers in diameter and about 5 micrometer to about 200 micrometers in length.

16. The fiber reinforced cementitious mixture of claim 13, wherein the cementitious mixture has an increased resistance to cracking of at least 5,200% without loss to flexure strength, compressive strength or impact toughness.

17. The fiber reinforced cementitious mixture of claim 13, wherein the aggregate material is sand, gravel or crushed stone or a combination thereof.

18. The fiber reinforced cementitious mixture of claim 13, wherein the chemical admixture comprises a polycarboxylate high-range water reducer (HRWR) or a sucrose-based retarder or a combination thereof.

19. The fiber reinforced cementitious mixture of claim 18, wherein the chemical admixture is 4% or less by weight of the microfine cement.

* * * * *